United States Patent [19]

Ensley

[11] Patent Number: 5,520,356
[45] Date of Patent: May 28, 1996

[54] SYSTEM FOR PROPELLING AND GUIDING A SOLID OBJECT WITH A BEAM OF ELECTROMAGNETIC RADIATION

[76] Inventor: Donald L. Ensley, P.O. Box 955, Bodega Bay, Calif. 94923

[21] Appl. No.: 930,820

[22] Filed: Aug. 14, 1992

[51] Int. Cl.⁶ .............................. B64C 27/00; H05H 1/24
[52] U.S. Cl. ............... 244/62; 244/172; 60/203.1
[58] Field of Search ................. 244/62, 172, 159, 244/158 R; 60/202, 203.1, 204

[56] References Cited

U.S. PATENT DOCUMENTS

| | | | |
|---|---|---|---|
| 3,083,528 | 4/1963 | Brown | 60/203.1 |
| 3,114,517 | 12/1963 | Brown | 244/172 |
| 3,206,925 | 9/1965 | Schiff | 60/203.1 |
| 3,535,543 | 10/1970 | Dailey | 244/159 |
| 3,542,316 | 11/1970 | Hart | 244/172 |
| 3,891,160 | 6/1975 | Minovitch | 244/172 |
| 4,036,012 | 7/1977 | Monsler | 60/203.1 |

OTHER PUBLICATIONS

Hamilton et al, "Laser Assisted Propulsion Research" *Radiation Energy Conversion in Space*, vol. 61, 1978, pp. 271–278.

Minovitch, "Solar Powered, Self–Refueling Microwave Propelled Interorbital Transp. Sys." AIAA 83, 1446, 1983.

*Primary Examiner*—Galen L. Barefoot
*Attorney, Agent, or Firm*—Arnold, White & Durkee

[57] ABSTRACT

A system for propelling a solid body having a transmit antenna for transmitting electromagnetic energy with a desired frequency and pattern. A solid body having a receiving antenna for receiving the transmitted energy and a fuel storage space, which receives fuel from the storage space and receives electromagnetic energy from the receiving antenna and in response thereto heats the fuel to produce a pressurized gas. A nozzle receives the pressurized gas and releases the gas from the solid body to produce a thrust force on the solid body.

1 Claim, 6 Drawing Sheets

SYSTEM FOR PROPELLING AND GUIDING A SOLID OBJECT WITH A BEAM OF ELECTROMAGNETIC RADIATION

FIELD OF THE INVENTION

This invention relates to a system for simultaneously energizing and guiding a missile satellite or other solid object using an intense microwave beam. Each missile or other solid object may be relatively small, light and entirely passive with no electronics on board.

A glossary of the technical terms and abbreviations used here is provided at the end of this specification.

SUMMARY OF THE INVENTION

This system provides substantial relative savings compared to conventional techniques in both missile production costs and testing, increased reliability resulting from the underlying simplicity of the system architecture, potential for widespread uses involving both tactical and strategic applications, and the likelihood of increased military effectiveness in lethality. The system also provides substantial savings in the launching and orbital control of satellites and other space vehicles.

The solid object is typically a small rocket propelled and guided missile. It is both propelled and guided by an integral, on-board microwave rocket motor. An on-board receiver antenna is nominally facing toward the transmitter line of sight when activated. A specially selected "fuel", or microwave absorber, is on board and absorbs sufficient energy per second for hot gas generation and rocket propulsion. The solid object is basically a very light plastic/composite with its mass mostly composed of absorber (initial to empty mass ratio $\approx 25$), which is a kinetic kill projectile at the target. A small dispersal charge, activated by RF energy reflected from the target, can also be used for single missile attack. In a barrage mode, several small missiles can be launched in both space and time to achieve high kill probability by overcoming CEP effects resulting from beam spread, steering and jitter at range.

Most previous directed energy-based systems have not taken advantage of "dead-time" during travel to the target. By integrating the RF power over the travel time to the target, the total work done on the missile payload, acting now as a KKV, can be many megajoules at range, even if only absorbing less than a magawatt.

Missile guidance is provided by taking advantage of the RF radiation pattern power density cross-track gradient. The received power is coupled to a matched guide array or coaxial lines, with a pattern symmetrical about the roll axis, before coupling to the individual resonant cavities or gas generating chambers. The sense of the received power coupled to the cavities can be reversed if desired, with power from one side of the antenna exciting cavities on the opposite side. Hence, as the missile is perturbed from the central axis of symmetry of the beam by inertial angular rates induced from target tracking, atmospheric gas dynamic or other forces, the cavities located on one side of the received power beam will increase thrust (gas temperature/ṁ) relative to the other side, producing a body axis torque and corrected path so as to seek the beam symmetry axis. This can be accomplished passively using only the characteristics of the absorber materials and their distribution about the roll axis, without the need for roll stabilization. Roll stabilization may also be provided, if desired.

The absorption MFP for the fuel is at least a hundred meters at the gas nozzle exit density. With dispersion, it is on the order of several kilometers or more. Hence, the usual "plume" problem for RF penetration is greatly relieved and allows the use of not only one but several missiles without prohibitive "RF fratricide" effects. Then, even if the RF beam (also acting as its own steering radar) provides a nominal central lobe area several orders of magnitude larger than the target cross section at range, appropriate barrage modes can still increase the integrated effective kinetic kill probability to near unity.

For tactical applications, either a single relatively large or several smaller missiles can be used. The beam gradient is much larger at the smaller range, increasing kill probability for a single missile. Also, this requires a correspondingly smaller RF source, although at a higher frequency, which is more appropriate for movable platforms such as helicopters, tanks, aircraft, ships, spacecraft or the like.

The missiles (or other solid objects) themselves are small, plastic/composite structures with a total launch mass of a few to ten kilograms each, with the burn-out mass between ten and a few hundred grams. The RF boundaries are defined nominally by aluminum film, but with other higher temperature films or coatings where needed internal to the missile.

DETAILED DESCRIPTION OF PREFERRED EMBODIMENTS

Figure 1:
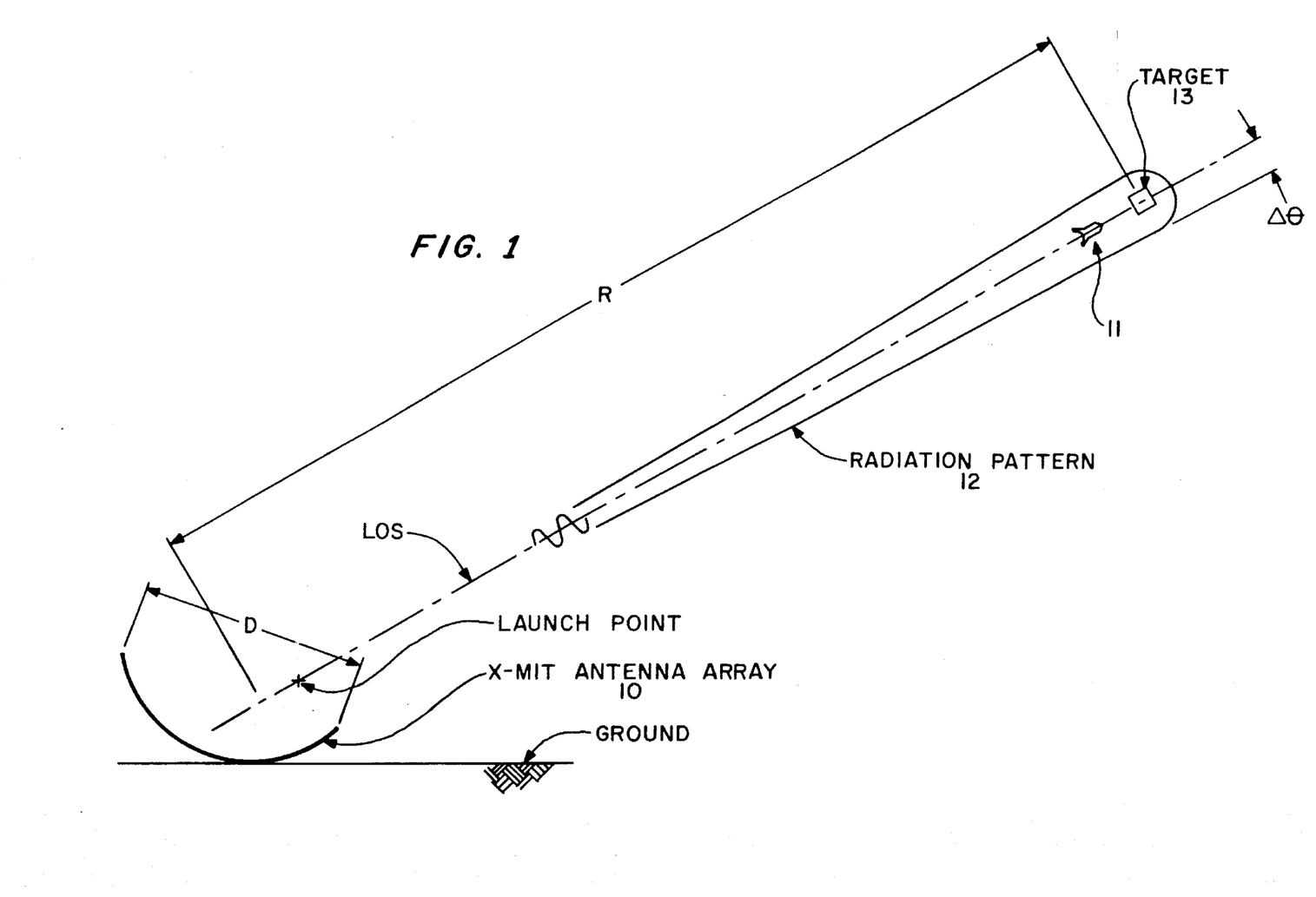
FIG. 1 is a diagramatic illustration of a missile launching and propulsion system embodying the present invention.
Figure 2:
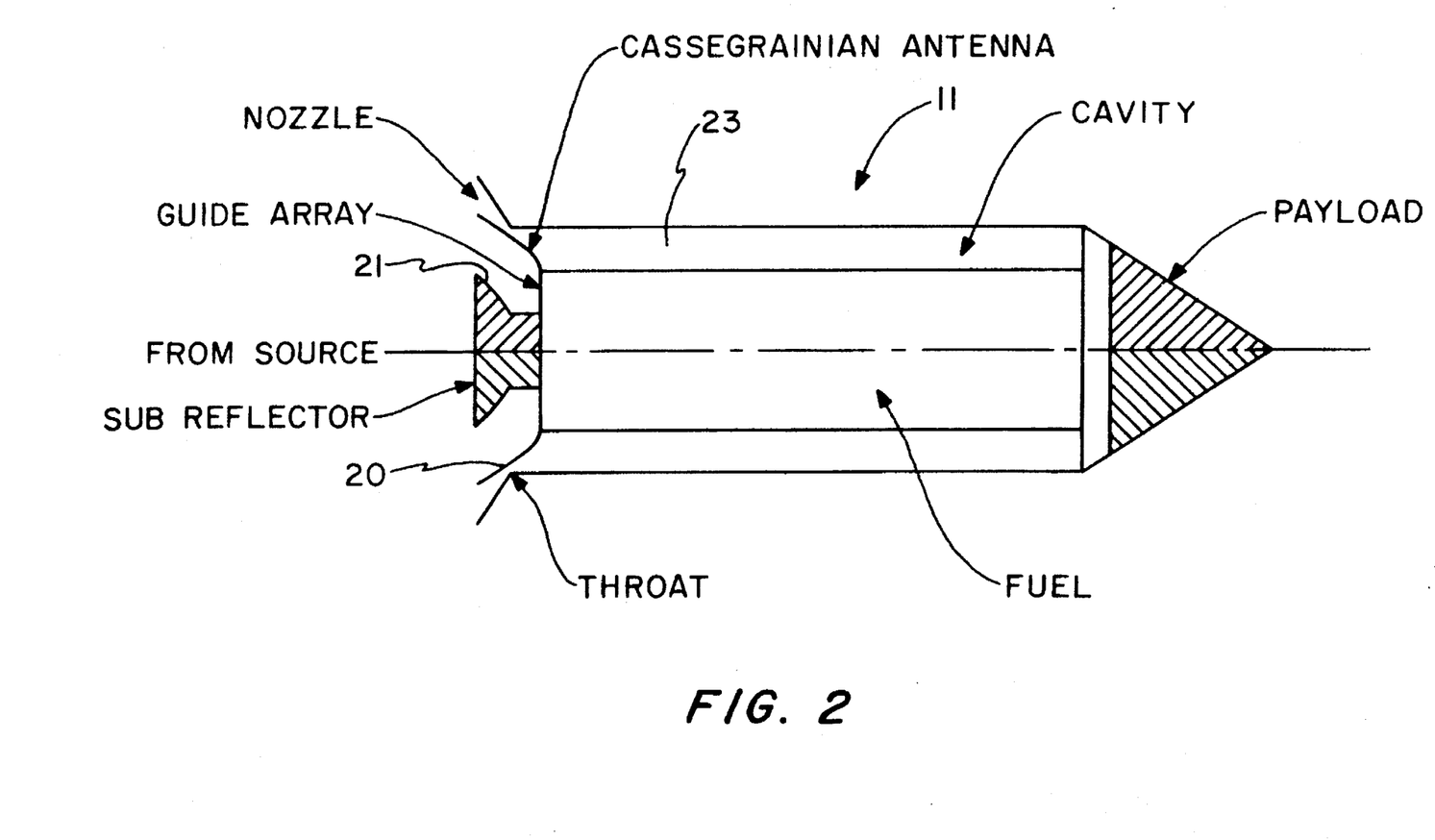
FIG. 2 is a diagrammatic longitudinal sectional view of a missile for use in the system of FIG. 1.

Turning now to the drawings and referring first to FIG. 1, there is shown a missile propulsion and guidance system which uses a terrestrial transmit antenna array 10 for guiding and propelling a missile along a beam 12 of electromagnetic energy from the antenna 10. In the illustrative system, the beam 12 is aimed at a target 13. The antenna array 10 is controlled by a conventional radar system which tracks the target 13 and makes any necessary adjustments in the energization of the antenna array 10 to cause the longitudinal axis of the radiation beam 12 to follow the target 13. The path of the missile 11 is always along the axis of the radiation beam 12, and thus whenever the axis of the beam 12 is moved the missile 11 moves along with it.

The various elements of the system illustrated in FIG. 1 will be described in more detail below, beginning with the missile 11. It will be appreciated that the propulsion and guidance system provided by this invention is useful not only for military applications, but also for the launching and control of satellites or other space vehicles. Furthermore, the system can be used not only to launch satellites, but also to turn satellites to the earth from their normal orbital positions.

I. Microwave Propulsion and Guidance Rocket Motor

A. Missile Structure

The structure of the missile is shown in FIGS. 2 through 5. The tail of the missile forms a Cassegrain receiving antenna which includes a main reflector 20 and a subreflector 21. Energy received from the transmit antenna 10 is reflected by the main reflector 20 onto the subreflector 21, which in turn reflects the energy into a circular array of coupling waveguides 22 (see FIGS. 4 and 5). These waveguides 22 guide the energy into corresponding resonant cavities 23 which receive a fuel absorber material which acts as a transducer to convert the electromagnetic energy into heat. The absorber material is a liquid, solid or gaseous fuel, such as water, which is converted to a gas by the heat generated by the absorbed electromagnetic energy. The gas expands as it is heated in the cavities 23 and is released through corresponding Delaval nozzles 24 arranged symmetrically around the periphery of the lower end of the missile. The exiting gas exerts thrust forces on the missile, thereby propelling the missile.

Figure 3:
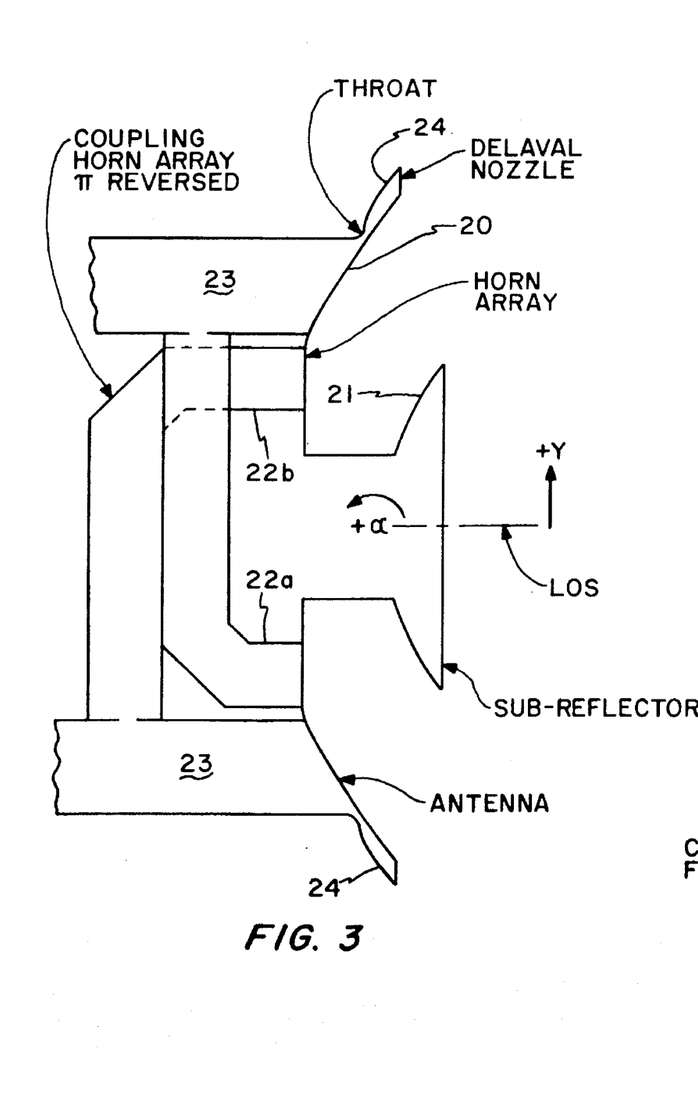
FIG. 3 is an enlarged logitudinal section through the tail end of a missile for use in the system of FIG. 1.

For guidance purposes, each of the coupling waveguides 22 transmits the energy received thereby to a resonant cavity 23 that is diametrically opposed to the antenna region where that energy was received (see the waveguides 22a and 22b in FIG. 3). This causes the propulsion gases to be generated with a pattern that is the mirror image of the pattern received by the antenna. Thus, if the missile is translated relative to the axis of the transmitted beam so that more energy is received in the lower region of the antenna as viewed in FIGS. 4 and 5, a greater thrust will be produced by the upper nozzles until the missile is returned to a position where its axis is in line with that of the transmitted beam.

B. Aerodynamic Performance

Atmospheric drag is primarily of two types; one is viscous drag coming from dynamic pressure forces integrated over the surface, especially for a Mach number M>1. For subsonic speeds, there is no wave drag from the shock front and most of the drag force is boundary layer or skin friction. For M>1, however, wave drag increases rapidly and pressure drag forces dominate. Also, in either case, the Reynolds number range is an indication of laminar or turbulent flow characteristics, which affect the drag at a given stream velocity.

The mostly sub-sonic ($M \leq 1$) skin friction drag coefficient is $C_f$, and for $M \geq 1$ the dynamic pressure drag coefficient is $C_p$. R is the Reynolds number. The definition of torque and drag forces in terms of these parameters and stagnation pressure $P_d$, are given by:

$C_f = (F_s/\text{skin area})/P_d$, where $F_s$ is boundary layer skin drag force, $P_d = \rho U^2/2$.

$C_D = \pi^2 (d/L)^2$ Von Karman area rule for $M \geq 1$.

$R = \rho U L/\mu$, where U is stream speed, $\mu$ is viscosity, $\rho$ is density of air.

$F_D \approx P_d S C_D$, where S is the maximum projected cross sectional area in the direction of nominal U.

$$F_y = \frac{\rho U_y^2}{2} S_s C_f, \quad T = F_y R_{cp},$$

where $S_s$, $U_y$ are cross-track total skin area and air velocity, $R_{cp}$ is distance from center of pressure to c.m.

The torque is T and maximum cross-track force is $F_y$, and a constant thrust force of $F_0$ is assumed. The values of the forces are therefore dependent upon altitude ($\rho$) and temperature ($\mu$). Air density and viscosity are well known functions of altitude and temperature.

The missile shape is a roughly conical body of revolution, except more gradually tapered or streamlined, with the maximum diameter d at the antenna end and an overall length L. A d of about 40 cm and L of about a meter are preferred. This geometry is within the validity range of the above dimensional coefficient representation. There are no other aerodynamic surfaces present, as guidance and control is provided by the microwave field. This type of ratio and shape is best fitted with the Von Karman coefficient for $M \geq 1$. The air viscosity can be taken at about 200 micropoise (it varies from 100 to 500 over a temperature of 0° to 1100° C.), and for either sub-sonic or low supersonic speeds, the value corresponding to at most a few hundred °C. can be used. Also, the density of air is approximately exponential with altitude, with $10^{-3}$ gm/cm$^3$ at sea level, about $10^{-4}$ at 20 Km and $10^{-5}$ at 35 Km in the same units.

1. Drag Force Effects

For the example of a missile launched from the ground, neglecting gravity since the initial acceleration is >>one g, it will climb at a speed such that the drag forces are essentially equal to the thrust, in sufficiently dense air. From sea level to about 20 Km, this can be estimated from the boundary layer viscous drag equation above by equating $F_s$ to $F_0$ ($F_0$ in this case is $3.4 \times 10^7$ dynes). With $S_s$ the total missile skin area $\approx 6.25 \times 10^3$ cm$^2$ and $\mu = 2 \times 10^{-4}$ Poise. Assuming $M \approx 1$, the Reynolds number for this case is about $R = \rho U_2 L/\mu = (10^{-3})(3.3 \times 10^4) 1 \times 10^2/2 \times 10^{-4} \approx 1.50 \times 10^7$. This is in the transition range from laminar to turbulent flow. Using the referenced value for $C_f$ at this R and for $M \approx 1$, $C_f \approx 3 \times 10^{-3}$. Then the value of $F_s$ from the above relations is $F_s = C_f S_s (\frac{1}{2} \rho U_s^2)$, which would $\approx F_0$ if the velocity corresponds to about 1.5 $U_s$ or $M \approx 1.5$.

As the missile climbs above 20 Km, the skin friction drops rapidly relative to supersonic forces as the speed increases. The supersonic drag forces, which now dominate the friction force, roughly equal thrust in this altitude range. From the above relations, $F_D = P_d S_n C_D = \frac{1}{2} \rho_a U^2 (\pi d^2/4)(\pi d/L)^2$. Setting this equal to $F_0$ and using the average air density between 20 and 35 Km as $\rho_a \approx 2 \times 10^{-5}$ gm/cm$^2$, $U \approx 1.3 \times 10^5$ cm/sec or $M \approx 4.0$. Above 45 Km ($\rho/\rho_0 \leq 10^{-3}$), the velocity needed for equilibration between drag and thrust is beyond the vacuum orbit values, so from this point up the missile performs about as in the vacuum orbit. In other words, the drag forces beyond this orbit point are not a significant fraction of the thrust.

From the standpoint of performance, taking a 45° orbit angle relative to local vertical, the missile spends a time climbing through the dense atmosphere of about $t_1 \approx 2 \times 10^6/(0.707)U_{20} + 2 \times 10^6/0.707)U_{40}$, where the average velocities from the above analysis are $U_{20} \approx 1.8$ $U_s$ and $U_{40}$ about 4.8 $U_s$. This gives about $40+17= 57$ sec. Using the vacuum rocket equations from this point in the orbit, the total range is about 72 miles, velocity is about $1 \times 10^6$ cm/sec, in an additional 23 sec for a total "burn" time of about 80 seconds.

The previous vacuum orbit for this case, neglecting all external forces, is estimated at about 40 seconds, so for the same constant $F_0$ the fuel mass must be increased by about a factor or two in order to achieve about the same performance. In this example, because an assumed fuel mass of 4 kg occupies less than 5% of the missile volume, doubling (or even tripling) this fuel mass does not add much if any throw weight to the vehicle.

This means the performance in terms of thrust per unit throw weight near the target (agility) is not affected significantly. However, for a given specific impulse and a constant $F_0$ (fixed RF power density at the missile antenna), the fuel mass must be increased by about a factor of two, decreasing in the propulsive and RF efficiencies by about 50% and increasing total engagement time by about a factor of two in order to "pay" for launching through the atmosphere. In order to maintain a given total engagement time, the thrust is increased by supplying more RF power density by about a factor of two.

In the above analysis, it was arbitrarily assumed for simplicity of analysis in explaining the principle of operation that $F_0$ was a constant. The available RF peak power ($P_s$) was modulated inversely with range in order to provide this constant force. In a more realistic case involving aerodynamic performance, however, the RF modulation can easily be modified to achieve essentially vacuum orbit engagement time performance levels within the atmosphere, with a much larger initial accelerating force during dense atmospheric flight, and then reduced back to a lower fraction of peak available power. This amounts to a larger duty cycle on the RF system and lower overall RF and propulsive efficiencies, since some of the work which was done on the payload in the vacuum case is now done against drag forces. Of course, the increased fuel mass mentioned above is still needed, since now a higher fuel "burn" rate is used for a shorter engagement time. There are also certain structural penalties in throw weight, as described below, since a higher drag speed means higher skin temperatures and aerodynamic force stresses. The trade-off from this point is mission dependent.

2. Guidance and Control

There are two independent guidance mechanisms which act simultaneously on the missile, as will be appreciated from FIGS. 1–6. First, the missile can experience a cross-track translational deviation y (see FIGS. 3, 4 and 6) of its center of mass with respect to the axis of symmetry of the radiation pattern. This deviation produces an asymmetrical distribution of energy across the surface of the main reflector of the receiving antenna, even if the axis of that reflector remains parallel to the axis of symmetry of the radiation pattern. Asymmetrical energy distribution produces greater thrust on the side of the missile that is farthest away from the axis of symmetry of the transmitted radiation pattern. The resultant correcting thrust produces a torque, described in more detail below as the "theta torque," with a sense such as to provide a cross-track component of thrust which tends to reduce the translational deviation y to zero. With this torque alone, however, the missile could become unstable, with each succeeding corrective displacement growing in magnitude. Stability is achieved, however, because of the "alpha torque" mechanism described below.

The missile can also undergo an angular deviation $\alpha$ (see FIG. 6) from the axis of symmetry of the radiation pattern, even in the absence of any translational deviation of the center of mass. Such an angular deviation causes the average power pattern from the sub-reflector 21 to shift with respect to the apertures of the waveguides 22, as illustrated by the broken-line circle 25 in FIG. 4. This causes an asymmetry in power absorption in the circular array of resonant cavities 23, thereby producing greater thrust on the side of the missile that is closest to the axis of symmetry of the transmitted radiation beam. The resultant correcting thrust produces a torque with a sense that reduces the angular deviation to zero. The sense of this alpha torque is opposite that of the theta torque, and is necessary to stabilize the motion by providing damped undulations about the guiding center.

The $F_y$ force must be considerably less than $F_0$ for the missile control system to compensate by directional control of the thrust. The cross-track stream motion is always sub-sonic. Using the sub-sonic drag force, and the cross-axis total skin area for $S_y$, the maximum cross-track air speed for which control can be reasonably maintained can be calculated. Assuming a maximum of 50% of $F_0$ for this force (30° control angle) at sea-level for laminar flow, and 0<M<4 range speeds, the value for the drag coefficient of $C_f \approx 10^{-2}$ and $F_y = \frac{1}{2} \rho_0 U_y^2 C_f S_x$ which if equated to 0.5 $F_0$ and a missile area of $\pi dL/2 \approx 6 \times 10^3$ cm$^2$, gives a value for $U_y \approx 2.4 \times 10^4$ cm/sec, or about M 0.70. It is therefore unlikely that any kind of dense atmospheric disturbance normally encountered, including very severe storms or other sources of wind, or any other credible cross-track maneuvering velocities below the speed of sound, could result in control system failure.

The torque resulting from the $F_y$ force is $T = F_y R_{cp}$. A homogeneous body has the c.m. and center of pressure coincide, and T=0. For a missile, the antenna region has a lower average density than that further along the axis. The c.m. is nominally located several cm forward of the center of pressure because of this. However, the c.p. to c.m. separation can be adjusted to near zero for initial conditions.

However, for purposes of control system performance analysis, it should be assumed that fuel movement and expenditure, missile structural flexure, and other factors could potentially cause a maximum $R_{cp}/r_n \leq 20\%$ net separation in this quantity during any violent high g ($\approx 100$ g's) cross-axis maneuvering and while transiting the dense regions of the atmosphere. The ratio of maximum disturbance torque to maximum available control torque, $F_0 r_n$, where $r_n$ is nozzle radius, is then given by $T/F_0 r_n = (F_y/F_0)(R_{cp}/r_n)$. In the example, $R_{cp}/r_n \leq 0.2$, and for the above maximum value of $F_y$ one has a ratio of about 10% of maximum available control torque. Hence, as long as $F_y$ is designed to be within the maximum control range, so also is T.

C. Throw-Weight Variation

1. Essential RF Related Factors

The propulsive efficiency is defined as the ratio of payload kinetic energy to total RF energy absorbed during the engagement. For a constant fuel expenditure rate and specific impulse, it is given in terms of $\gamma = m_w/m_0$, where $m_w$ is throw mass and $m_0$ is launch mass, by $\beta_p = (\gamma/1-\gamma)\ln^2(\gamma)^{-1}$. The RF efficiency for this case is given by $\beta_{RF} = (\beta_p)3A_a a^2/16\pi c_p \Delta T t_b^2$, assuming a fixed far-field antenna gain, $a^2 = (\pi D/\lambda)^2$, ignoring atmospheric effects. In addition to the foregoing discussion on drag effects, as will be shown later, phased array antennas exhibit a gain which is a function of range from the antenna within a variation in range applicable to possible missile engagements. This increases the source power at a given range over and above that needed to maintain a given flux at the missile antenna, assuming a variation in power density only as a result of $r^2$ for a fixed transmit antenna gain. However, since for most engagements the far field gain can easily be exceeded at the engagement range, the overall efficiency is only affected by factors of the order of one or two (e.g. the average power during $t_b$ is only one half rather than one third of the same peak power). Hence, peak power is not much affected, and the values for missile radiation flux are approximately correct and can be used to estimate the RF throw weight. This is composed of the three basic elements, the antenna and sub-reflector, the guide array leading to each cavity, and the RF resonant cavities and DeLaval nozzles. These will now be considered in turn below.

The antenna, sub-reflector and coupling waveguide array are all characterized by essentially a common skin depth (e.g. for Al or Cu), since a high temperature environment is not needed for these areas. The power density or Poynting flux at the antenna is set by the system at $S_a$, in order to provide the required motor absorbed power, $P_a$, with $S_a=P_a/A_e$. Focusing at the subreflector and the area of the horn array and coupling guides (mode cross-section) determine the values of $S_a$ incident on the conductive skin of each surface area. The absorbed power flux at any of the surfaces is given by $S_i = B^2/8\pi) \delta\omega$, where $\delta$ is RF collisional skin depth and $\omega$ is radiation circular frequency and $S_i$ is RF flux evaluated at the surface. The ratio of absorbed flux to incident surface flux at any surface is then given by $S_i/S_a = 2\pi(\delta/\lambda)$, with $\lambda$ vacuum radiation wavelength. If there is essentially no heat transfer involved, as in the case of a metal on a very high thermal impedance substrate (plastic or composite), and the energy is absorbed over a long time compared to thermal relaxation (a thin metal film) in the film, then essentially all the absorbed RF energy will go into raising the local film temperature. The maximum film temperature rise, $\Delta T_i$, during an engagement time $t_b$, will then be approximately given by $\Delta T_i \approx S_i/m_iC_i$, where $C_i$ is temperature average specific heat and $m_i$ mass per unit area of the film.

For the missile example, the antenna flux is about 500 W/cm$^2$ and using an x-band skin depth (at 350° C.) of about $2\times10^{-4}$ cm for Al (density 2.7 g/cm$^3$) and a film $m_i$ value of about $3\times10^{-2}$ gm/cm$^2$ (film thickness≈100 microns), one arrives at $\Delta T_i \approx 1.7t_b$ °K. For a 40-second engagement, this is about 68 degrees and is insignificant. The antenna RF throw weight is only about $m_iA_f = 30$ gm.

The subreflector for this antenna has an area of $A_e/5$, and a temperature sensitivity of about $8.5t_b$, or for the 40-second $t_b$ a temperature rise of about 340° K., which is still not very significant. The RF throw weight from the subreflector is about 6 gm. For the coupling array, ten horn coupled waveguides conduct one tenth of $P_a$ each to the resonant cavities. The horns occupy about twice a guide diameter for a few guide wavelengths in length. Then a standard $TE_{01}$ guide of radius $r_{01}=\lambda/1.64 \approx 1.829$ cm completes the circuit to the cavity input port. The guide area is then 10.5 cm$^2$ and a flux of about $S_a=4.75\times10^3$ W/cm$^2$ is in the guides. The temperature sensitivity in the guide and horn wall is then $\Delta T_i \approx 16.6t_v$ for the same $m_i$. For the assumed 40-second $t_b$, this gives a temperature rise of about 660 deg. The melting point for Al is around 660 deg C., so a slightly larger $m_i$ should be used for the guide array. For a 200 micron film with $m_i \approx 6\times10^{-2}$ gm/cm$^2$, the temperature rise would be about 330 degrees. For the assumed geometry, each guide is about 20 cm in length, providing a throw weight contribution from all ten guides of about 145 gm. Not counting the resonant cavities, up to this point the accumulated RF throw weight is about 181 gm.

The resonant cavities must operate in a high temperature environment, and are insulated against fuel heat conduction into the walls by having walls made of high temperature composite (carbon filament or equivalent), lined with even higher thermal impedance material as required (e.g. a turn of specially formulated CH$_2$ foam honeycomb). From the RF standpoint, if water or other relatively chemically inactive fuel is used for the gas generator, the skin can be directly exposed to the hot fuel. Otherwise, a thin and partially ablative high thermal impedance dielectric cavity liner can be used to protect the skin. In the first instance, a high temperature conductor (Mo, Ta alloys, mp≈3400° K.) with a skin depth of around $4\times10^{-4}$ cm is needed, and in the second instance copper can be used, with a skin depth of about $1\times10^{-4}$ cm and mp≈1400 °K. In the first instance, with a loaded Q of around 600, and $m_i$ of $6\times10^{-2}$ gm/cm$^2$, the temperature sensitivity is about $\Delta T \approx 25.42t_b$. For the 40-second $t_b$, the temperature rise is about 1,016 deg C. If one adds to this a gas temperature of about 1400 deg centigrade, the maximum surface temperature at $t_b$ is about 2,400 ° C. or 2700° K., which is still a safe temperature for high temperature alloys. In case a high thermal impedance dielectric liner is used, one can use an RF skin of copper, with $\delta \approx 1\times10^{-4}$ cm, with a $\Delta T_i = 6.36t_b$ for the same $m_i$, for a temperature rise of about 254 degrees. In either case, the RF throw weight contribution from the cavities is about 377 gm.

The DeLaval nozzles are incorporated into one end of each resonant cavity, and occupy a very small fraction of total surface area or volume. Even with a high temperature liner for the nozzle throat, therefore, an additional throw mass of at most about 5% of that already allowed for the entire cavity liner, up to 38 gms of additional throw weight is allowed.

Combining the above figures, the total required practical RF throw-weight is about 596 gm.

2. Structural Throw-weight Contribution

The missile is basically an ultra light structure of composite and plastic materials, filled with fuel and with an RF conductive boundary attached. The structural throw weight contribution is related to withstanding aerodynamic and RF cavity pressure stresses without excessive flexure (strain) or structural failure. It consists mainly of two elements, the RF cavity fuel pressure casing and the rest of the body. These will now be considered in turn below.

The missile is deliberately operated at relatively low cavity fuel pressures, $P_g$, of about 12.5 atmospheres in order to minimize cavity wall stresses. The projected area for each cavity is given by $s_c \approx 2\pi r_{01}L$. The hoop stress area is $s_h = 2\Delta x(L+2r_{01})$, where $\Delta x$ is wall thickness and the wall hoop stress is given by $\sigma_c = (s_c/s_h)P_g$. In the example used earlier, for 12.5 atmospheres the sensitivity is $\sigma_c \approx 2\times10^3/\Delta x$ lbs/in$^2$ per cm of wall material. This is a modest stress level and can be accommodated by rated tensile stress of many materials. A half millimeter of composite (wound) or fiber reinforced foam honeycomb can be used effectively. At a mean density of about 1 gm/cm$^3$ for a composite, this would incur a throw weight for all ten cavities of less than 300 gm to accommodate the cavity pressures. This is very de-rated from the standpoint of available stress limits, however, and can be accommodated with perhaps one third to one half this weight.

The rest of the missile body is composed of foam honeycomb, mean density about 0.1 g/cm$^3$, with flexible composite ribs and hoops for shape stability and shear stress distribution. The antenna and subreflector are a solid honeycomb with a metal film on the surface. Even with a fiber wound nose cone area and ten support stringers and hoops, the missile body without cavities is very light. A 1 mm skin over the entire surface of 3000 cm$^2$ using one mm honeycomb provides a throw weight of about 100 gm. The antenna and subreflector are fiber reinforced and solid honeycomb for an additional throw weight of about 30 g.

The entire structural throw weight then amounts to about 430 gm, including both cavities and body weight. This combines with the RF throw weight for a total missile throw weight of about 1026 gm. Comparing this with the earlier conceptual example, which used 200 gm for this figure, one can see that practical considerations provide a value more like five times this figure. Even with allowance for some additional small increases, such as additional structural stringers, small fuel injectors, a flexible "fuel tank" liner or small "payload" items related to application scenarios (e.g., passive RF proximity arc switch and dispersal charge), the missile throw weight in this size system is approximately a kilogram. For smaller, tactical applications, much smaller missiles could be constructed.

3. Throw-weight Performance Effects

As to effects upon performance, using the earlier value of $m_f=4$ kg, and $m_w=200$ gm, $m_0=4.2$ kg, a value of $\gamma=4.76\times 10^{-2}$ and propulsive efficiency of $\eta_p \approx 46.3\%$ resulted. However, for a value of $m_0=5$ kg, $m_f=4$ kg, one has $\gamma= 0.20$, or $m_f/m_0$ of about 0.8, and efficiency of $\eta_p \approx 64.8\%$. Consequently, this is very near the peak efficiency in terms of $\gamma$ (peak $\eta_p$ is at $m_f/m_0 \approx 0.8$) and the increased throw weight in this approximate range actually increases efficiency by about 50%. An efficiency above 50% can be maintained for a variation in $m_f/m_0$ of from about 0.5 to 0.93. If fuel mass is increased by a factor of two to roughly accommodate a given range with atmospheric effects included, the efficiency can still be in the 50% range.

Nominal agility is less, since one has the same assumed thrust with five times the throw weight, providing a decrease in agility by a factor of five. The earlier estimate for this parameter was about 170 g's, so the agility is about 34 g's. This assumes a steady mass flow rate of 100 g/sec and specific impulse of 340. Because of the relatively small throw weight of this type system, this is still a respectable performance. However, the specific impulse can be increased to about twice this value without significantly increasing throw weight, by operating at about twice the chamber temperature, since a comfortable safety margin for cavity pressure can be maintained. Also, if needed, the system can operate in an "end-game" mode for about one second at a somewhat higher flow rate, about three to four times as great, with about the same throw weight, and produce an agility of from 68 to 250 g's if needed.

D. Microwave Fuel Heating

Macroscopic microwave absorption can be determined for any material, under given thermodynamic conditions, once the real and imaginary parts of its permittivity ($\epsilon',\epsilon''$) and permeability ($\mu',\mu''$) are known. The fractional power attenuation of a signal, with $S_0$ the initial Poynting flux and $k_0$ the propagation wave vector in vacuo for the radiation field, is given by: $S(r)/S_0=e^{-\alpha r}$, with the attenuation coefficient $\alpha=2k_0 x$ and $x=\mathrm{Im}(\mu\epsilon)^{1/2}$. Also, $J.E=-\partial S/\partial r=\alpha S$, power absorption/cm$^3$ in the steady state. This can also be rewritten in terms of a "loss-tangent" $\tan \eta$, where $\eta=\epsilon''/\epsilon'$ and the above expression becomes:

$$\alpha=2k_0 x=k_0\{(\epsilon'/2)[\,(1+\tan^2\eta)^{1/2}-1]\}^{1/2}.$$

The microscopic basis for this relation is the excitation of molecular rotational quantum states by stimulated absorption, and the subsequent depopulation of these states via interparticle collisions, making the spontaneous decay rate much larger than the stimulated decay rate. This latter action transfers the absorbed photon energy into random internal energy of the gas, increasing its temperature. The spectroscopic rotational constants for most molecules are in the range of 1 to 10 Ghz. Only the much higher energy (frequency) vibration and electronic levels are involved in far infrared and optical and higher frequency absorption. All microwave band absorption corresponds to excitation of molecular rotation states.

In addition, the presence of a permanent electric dipole moment, with transition matrix element between the i and j states, $\mu_{ij}$, or a permanent magnetic dipole moment $m_{ij}$, is necessary for appreciable dipole-dipole interaction probability. Missile "fuel" requires a suitable molecular structure having a large value of $M_{ij}$, resulting in appreciable real and imaginary macroscopic polarization fields and permittivity $\epsilon=\epsilon'+\epsilon''$. For most substances considered here the permanent molecular dipole magnetic moment is very small, resulting in a constant real part of unity and zero imaginary part for the macroscopic permeability. Also, as small as possible molecular mass and high dissociation temperature are desirable fuel characteristics.

Some molecules, such as water, have large centrifugal corrections due to interatomic stresses from high angular velocity states. Others, such as CHC compounds, have two orders of magnitude larger moments of inertia and therefore negligible non-linear corrections of this kind. All molecules in the liquid phase or gas at high pressures and exhibiting permanent electric or magnetic dipole moments have large pressure broadening caused by high intermolecular collision rates.

The molecular level absorption of microwave energy per unit length can be related to the macroscopic absorption coefficient $\alpha$. The correct quantum mechanical expression for $\alpha$ in terms of the matrix element for the dipole moment $\mu_{ij}$ between the transition states i,j, the radiation frequency $\upsilon$, transition frequency $\upsilon_0$, molecular density N, fraction of molecules in the lower energy state f, and the effective mean time between molecular collisions $\tau$ is given by the following expression:

$$\alpha = \frac{8\pi^2 Nf|\mu_{ij}|^2 \nu^2}{3ckT}\left[\frac{1/2\pi\tau}{(\nu-\nu_0)^2+(1/2\pi\tau)^2}+\frac{1/2\pi\tau}{(\nu+\nu_0)^2+(1/2\pi\tau)^2}\right].$$

In the case of a hot gas phase material, $1/2\pi\tau \gg \upsilon_0$ and the Debye relation is obtained in the dense limit (f=½) and given from the above by $$\alpha = \frac{4\pi k_0 N |\mu_{ij}|^2}{3kT}\left[\frac{w\tau}{1+w^2\tau^2}\right].$$

By comparing this expression with the earlier macroscopic value of $\alpha$ above, one can identify the molecular contributions to the macroscopic attenuation, with $$\chi = \mathrm{Im}(\mu\epsilon)^{1/2} = \frac{2\pi N\mu^2}{3kT}\left[\frac{w\tau}{1+w^2\tau^2}\right].$$

The macroscopic losses depend directly on the square of the electric dipole moment for the molecule, inversely on the thermal energy, directly upon the molecular density and on a simple function of the radiation frequency and the intermolecular collision frequency. The latter depends upon the mean thermal molecular speed v, and the effective collision diameter for the molecules, a, with $\tau=a/v$, v=thermal speed $\approx (2kT/M)^{1/2}$, with M=molecular mass.

Note that specific absorption per unit mass is independent of density. At this point it is necessary to decide whether to use progressive or standing wave energy for the motor. For this purpose, one can take a specific example of RF frequency, and water, with an electric dipole moment of 1.8 Debye units, as a base line fuel, with which others may be readily compared. For availability of existing HPM sources, one can take $\upsilon$ at X-Band ($\simeq 10$ Ghz), although one could probably go up or down in w if needed. The real and imaginary permittivity for water at 300° K. are $\epsilon'=80.0$ and $\epsilon''=40.0$, providing a value of $\alpha$ from the above relations of $\alpha=5.0$ cm$^{-1}$ at liquid density (1.0 gm-cm$^{-3}$). The value of $\alpha$ would drop by about 5:1 at an assumed maximum operating temperature of about 1500° K. ($\Delta T=1200°$ C.). This requires an absorbed energy (chemical fuel equivalent enthalpy/gm) of $4.8 \times 10^3$ J/gm of fuel.

Selecting a typical operating point at a fuel mass flow rate $\dot{m}$ of about $10^2$ gm/sec (see the next section for an explanation of these operating parameters), a total absorption rate of about 480 KW of RF power is needed, where the average fuel heating time in the interaction region is about 0.20 second. Under these approximate conditions, the fuel density in the cavity region is about $1.8 \times 10^{-3}$ gm/cm$^3$. The mean free path for progressive wave attenuation, $\Gamma=\alpha^{-1}$, for the above radiation frequency in the hot gas is about $5.0/(5.0)(1.8 \times 10^{-3}) \simeq 5.60$ meters. It is apparent that even with a fuel flow rate of $10^3$ g/sec, and very high power, a rather large rocket would be needed using progressive wave absorption. It is concluded that for most applications standing wave or oven mode attenuation is needed, calling for a fuel Q-spoiled resonant cavity design as the "combustion chamber".

Next, one can estimate the efficiency of the cavity as a fuel heater. The loaded Q of the cavity $Q_1 = Q_f Q_0/(Q_f + Q_0)$, where $Q_f$ is the Q from the fuel alone, given by $Q_f = W\upsilon/\alpha S_c V_c$, where W is stored RF energy, $S_c$ the average cavity Poynting flux and $V_c$ cavity volume, respectively. $Q_0$ is the Q from the skin effect of the cavity surface material alone, without fuel, given by $Q_0 = W\upsilon/A_c \delta k_0 S_c$, where the skin depth of the surface conductor at frequency $\upsilon$ is $\delta$, and cavity skin surface area is $A_c$. Taking a value for $\delta$ of about $10^4$ cm for BeCu at 1000° C., a $V_c/A_c$ ratio of about 2.5 ($V_c \simeq 1 \times 10^{-4}$ cm$^3$) and with the above value of mean free path for attenuation ($\Gamma$), one arrives at a ratio $Q_0/Q_f \simeq 20$. Reasonable skin material and temperature, geometry and wavelength parameter variation can adjust this figure from 5 to about 100. Consequently, the fuel Q-spoils the cavity, with a $Q_f \simeq \Gamma/\lambda$, where $\lambda$ is radiation vacuum wavelength, and energy absorption time constant of $\tau = Q_f/\upsilon$. Hence, the radiation can bounce back and forth within the cavity fuel and travel a mean free absorption path of 5.60 meters in about $\tau = 2 \times 10^{-8}$ sec. This time is essentially instantaneous from the standpoint of the fuel throughput hydrodynamic flow rate within the cavity ($\simeq 10^2$ cm/sec), and any fuel mass contained within the cavity will absorb the coupled flux and increase its temperature, depending only upon the RF Poynting flux, specific heat and mass of fuel present.

A microwave cavity can effectively heat the fuel at useable mass flow rates and within reasonable volumes, with a chemical fuel equivalent enthalpy per gram of about $4.8 \times 10^3$ J/gm. This may correspond to an RF receiver power density of around 0.5 KW/cm$^2$. High explosive has an energy content of about this value at 2 MJ/lb, but is of course released over a much shorter time. High performance chemical rocket fuels can reach enthalpies per gram about equal to this value. A mass flow rate is established by mostly self-pressurized fuel injection at one end of a cavity, with an output rate through a DeLaval nozzle throat ($v_t \simeq$ isentropic sound speed$=(\gamma R T_c)^{1/2}$), to provide the desired value for the mass flow rate $\dot{m}$. For instance, a hundred grams injected per second, and flowing out heated per second, would maintain steady RF coupling and absorption into a constant 100 gm load.

E. Theoretical Rocket Performance Parameters

Only simple ideal gas relations will be used here in order to illustrate the basic rocket performance parameters relevant to the system of this invention. Details of rocket technology involving high temperature materials, real and dissociating gas thermodynamics and optimized thermal performance are well known to rocket designers. In steady state one dimensional flow, $h_c$, $h_e$ are enthalpy per gram of the fuel in the cavity and exit nozzle, respectively, $\gamma$ is the ratio of specific heats ($=c_p/c_v$), and $V_e$, $V_s$ are gas velocity at the exit and DeLaval nozzle throat, respectively (in this type nozzle, $V_s$ is the local sound speed in the throat), V is rocket velocity. $C_p$, $T_c$, $T_e$ are specific heat and temperatures in the cavity and exit nozzle, $m_f$, $m_0$ are fuel and total mass, respectively, $\dot{m}$ is fuel mass flow rate, $a_0$ is initial acceleration, $m_p$ is payload or burn-out mass, g is acceleration of gravity, M is average molar mass of the fuel, and $P_c$, $P_e$ are gas pressure in the cavity and exit, respectively. Use of a DeLaval nozzle means generating sufficient pressure in the cavity to drive the gas velocity in the throat to the local sound speed, and then expanding the nozzle toward the exit so that $v_e/v_s > 1$. R is gas constant ($=8.317$ J/mole-°K.). Then the following relations exist: $v_e^2/2 + V_c^2/2 = h_c - h_e = c_p(T_c - T_e)$ and taking $v_c^2 \ll v_e^2$, $v_e = [2C_p T_c(1 - T_e/T_c)]^{1/2}$, exit nozzle speed. Also, $$v_s^2 = \frac{2\gamma R T_c}{(\gamma+1)M}$$

$\eta$=thermal efficiency$=1 - T_e/T_c = 1 - (P_e/P_c)^{(\gamma-1)/\gamma}$. The difference between the RF energy absorbed in the fuel and that remaining in it after exiting the rocket is the net energy available to propel the rocket and provide the kinetic energy to the expended fuel. $a(t)$, $V(t)$ and $\delta(t)$ are the time dependent acceleration, velocity and displacement of the rocket in inertial space. A relation for displaying the energetics of the rocket after burn-out time $t_b$ is then:

$$h_c - h_e = K_r/m_f + K_f/m_f$$

where $K_r$, $K_f$ are payload and fuel energies.

Neglecting gravity and evaluating terms in the c.m. or inertial frame of reference in which V is measured, $K_r/m_f = m_p V^2/2m_f = (m_0/m_f - 1)V^2/2$ and for the gas kinetic energy per unit fuel mass $$\frac{K_f}{m_f} = \frac{\dot{m}}{2m_f}\int_0^{tb}[v_e - V(t)]^2 dt = \frac{v_e^2}{2} - \frac{v_e m}{m_f}\delta(t_b) +$$

$$\frac{v_e^2 m_0}{m_f \dot{m}}\{(1 - m_f/m_0) \cdot [-\ln^2(1 - m_f/m_0)^{-1} - 2\ln(1 -$$

$$m_f/m_0)^{-1} - 2] + 2\}, \text{ and where } V(t) = \int_0^{tb} a^b(t)dt =$$

$$v_e \ln(1 - m_f/m_0)^{-1}, \text{ and } \delta(t_b) = \int_0^{tb}\int_0^t a(t')dt' =$$

$$v_e\left[t_b + \frac{m_0}{\dot{m}}(1 - M_f/m_0)\ln(1 - m_f/m_0)\right]$$

The reactive inertial rocket motor force is given from Newton's second law as $F_T = \dot{m}v_e$ so $a(t) = F_T/m(t) = \dot{m}v_e/(m_0 - \dot{m}t)$.

In order to illustrate those features of importance to a missile motor, a specific example will be described, using water as fuel, and corresponding to a burn time of about 40 seconds, prototypical of strategic missile defense parameters. A fuel flow rate of $10^2$ g/sec is chosen, for fuel mass of $4\times10^3$ gm at liquid density. The missile burn-out payload mass can be very small because there are no electronics on board and RF at these power densities can be guided with conductive films on a light weight plastic or composite structure, somewhat analogous to a small strip-line antenna with water in it. A value of 200 gm is reasonable for the assumed fuel mass and volume, and a value of $m_f/m_0 = 0.95238$.

Neglecting the possibility of fuel film cooling, the thermodynamic operating point is chosen to correspond to less than the melting point of the cavity conductor, in this case $T_c \approx 1500°$ K. (1200° C.) for BeCu. Appreciable dissociation of $H_2O \leftrightarrow 2H_2 + O_2$, at pressures up to about 50 atmospheres, occurs$^5$ only above 1700° C. Since almost any reasonable thermal motor design will produce $\eta \approx 1$, this provides $v_e \approx (2c_p T_c)^{1/2} = 3.4 \times 10^5$ cm/sec (about mach 3.8 nozzle exit speed). The initial acceleration is $a_0 = 8.4$ g's, with steady thrust of 75 lb. The final acceleration is 170 g's. The launch weight is about 8.92 lb. Integrating the equation of motion, we have from the above relations the burnout values of $V(t_b) = 1.035 \times 10^6$ cm/sec (6.47 mi/sec), for a $K_T$ of 10.71 MJ payload kinetic energy at range. Assuming a reasonable RF flux density can be projected at range, the range would be $\delta(t_b) = 72$ miles.

The fuel volume, density and pressure can also be estimated from the ideal gas laws. For an isentropic process, one has $P_e/P_c = (T_e/T_c)^{\gamma/\gamma-1} = (p_e/p_c)^\gamma$. In order to maintain a mass flow rate of $\dot{m}$ through the cavity, this must be the flow rate at sound speed through the DeLaval throat, $v_s$. Then the throat density is $\rho_t = \dot{m}/v_s \Sigma$, where $\Sigma$ is the cross sectional area of the throat. The fuel density in the cavity is then given by:

$$\rho_c = \frac{\dot{m}}{v_s \Sigma} \left\{ \frac{2}{\gamma+1} \right\}^{-1/(\gamma-1)}$$

For the operating point used above, $\Sigma$ about two cm$^2$ and $\gamma = 1.3$, this gives a cavity density of $1.80 \times 10^{-3}$ gm/cm$^3$. For a fuel mass of $\approx 18$ gm in the cavity at any time, the required cavity volume would be about $1.0 \times 10^4$ cm$^3$. A roughly cylindrical cavity with a diameter of 20 cm and a length of 32 cm ($7.87 \times 12.6$ inches) contains this volume. The initial $m_f$ at liquid density requires only $4 \times 10^3$ cm$^3$. The equilibrium cavity pressure is $P_c = \rho_c RT_c/M \approx 12.5$ Atm or about 183 PSI. This value can be adjusted parametrically to anything between 50 and 350 PSI. To maintain thermal efficiency near unity and drive the DeLaval nozzle to sonic throat velocity, a value grater than $\approx 100$ PSI may be needed, if one is exhausting into a one atmosphere environment.

II. HPM and Missile System Parameters

A. HPM System

The basic HPM design criteria are determined by the desired missile range, energy, control and guidance CEP requirements. These in turn determine the RF power density at the source antenna and the physical size of the radiation system, which are application dependent. Use of various radiation patterns, achieved by a phased array or non-uniformly illuminated parabolic dish, may be required for system optimization.

For an optimized phased array or dish antenna of roughly circular shape, the central lobe will be restricted to an angular range $\Delta\Theta \approx \lambda/D$, where D is antenna diameter and $\lambda$ is radiation wavelength. The peak power density at range is approximately $P_s/\pi(R\Delta\Theta)^2$, where R is range ($R \gg R_0$) and $P_s$ is peak power radiated, with the target illumination area at range $\approx \pi(R\Delta\Theta)^2$. A well designed phased array radar pointing system with feedback can achieve a $1\sigma$ beam CEP at the target, after traversing the atmosphere, of less than 10% of $\Delta\Theta$, caused from atmospheric jitter and other deviations from a perfect radiation pattern and return signal at a range of about a hundred miles.

For the example given earlier, for a strategic missile defense, one needs about 480 KW over the missile receiver. The receiver for this geometry is about $10^3$ cm$^2$. Assuming a receiver radiation cross-section approximately equal to its geometrical cross section, this requires about 0.5 KW/cm$^2$ at range for propulsion (constant acceleration) all the way to the target. The table below lists some parameters for $\Delta\Theta$, $\lambda$, R, $R_0$ (antenna radius), $\bar{P}_s$ (average radiated power during engagement), ground surface level transmitter peak power density $P_d$ and the ratio of $P_d$ to air breakdown, $\zeta$, assuming air breakdown at about 300 KW/cm$^2$, and beam half-power spot size at range, $r_0$.

| Range (mi) | $\lambda$ (cm) | $P_s/\bar{P}_s$ (watts) | $\Delta\Theta$ | $R_0 = D/2$ | $P_d$ | $\zeta$ | $r_0$ |
|---|---|---|---|---|---|---|---|
| 72 | 3.0 | $10^{12}/3 \times 10^{11}$ | $2.2 \times 10^{-3}$ | 13.6 | $1.8 \times 10^5$ | 0.59 | 253 |
| 72 | 3.0 | $10^{11}/3 \times 10^{10}$ | $7.0 \times 10^{-4}$ | 42.0 | $1.8 \times 10^3$ | $5.9 \times 10^{-3}$ | 80 |
| 72 | 3.0 | $10^{10}/3 \times 10^9$ | $2.2 \times 10^{-4}$ | 136.0 | 18.0 | $5.9 \times 10^{-5}$ | 25 |
| 72 | 3.0 | $6 \times 10^7/2 \times 10^7$ | $2.0 \times 10^{-5}$ | 750.0 | $3.4 \times 10^{-3}$ | $10.^{-8}$ | 2.3 |
| 72 | 10.0 | $8 \times 10^7/2.7 \times 10^7$ | $2.2 \times 10^{-5}$ | 2,250.0 | $2 \times 10^{-3}$ | $8 \times 10^{-9}$ | 2.5 |
| 600 | 3.0 | $5 \times 10^{11}/1.8 \times 10^{11}$ | $1 \times 10^{-6}$ | $1.5 \times 10^4$ | $7 \times 10^{-2}$ | $2.4 \times 10^{-7}$ | 1.0 |

Evidently, air breakdown is not particularly a missile HPM system problem for most parameters of interest because of the large antenna diameter involved, even for very high total radiated power and long range. A $1\sigma$ CEP of one meter is achievable for a missile beam at range, using reasonable parameters for array phase jitter, placement tolerance, thermal effects and electronic control signal to noise factors. The maximum practical antenna gain is typically about 50%/70% of maximum theoretical gain, $a^2$. This is caused by spillover, blocking and aperture illumination efficiency.

Variable spacing and phasing can be employed in an array to achieve multiple (side lobe) radiation peaks of equal power for simultaneously tracking and propelling several missiles in a multiple target engagement. Also, the high total power levels indicated can be obtained using existing technology by using either a solid state amplifier or a smaller number of beam power tubes.

1. The Preferred Phased Array Antenna

Figure 7:
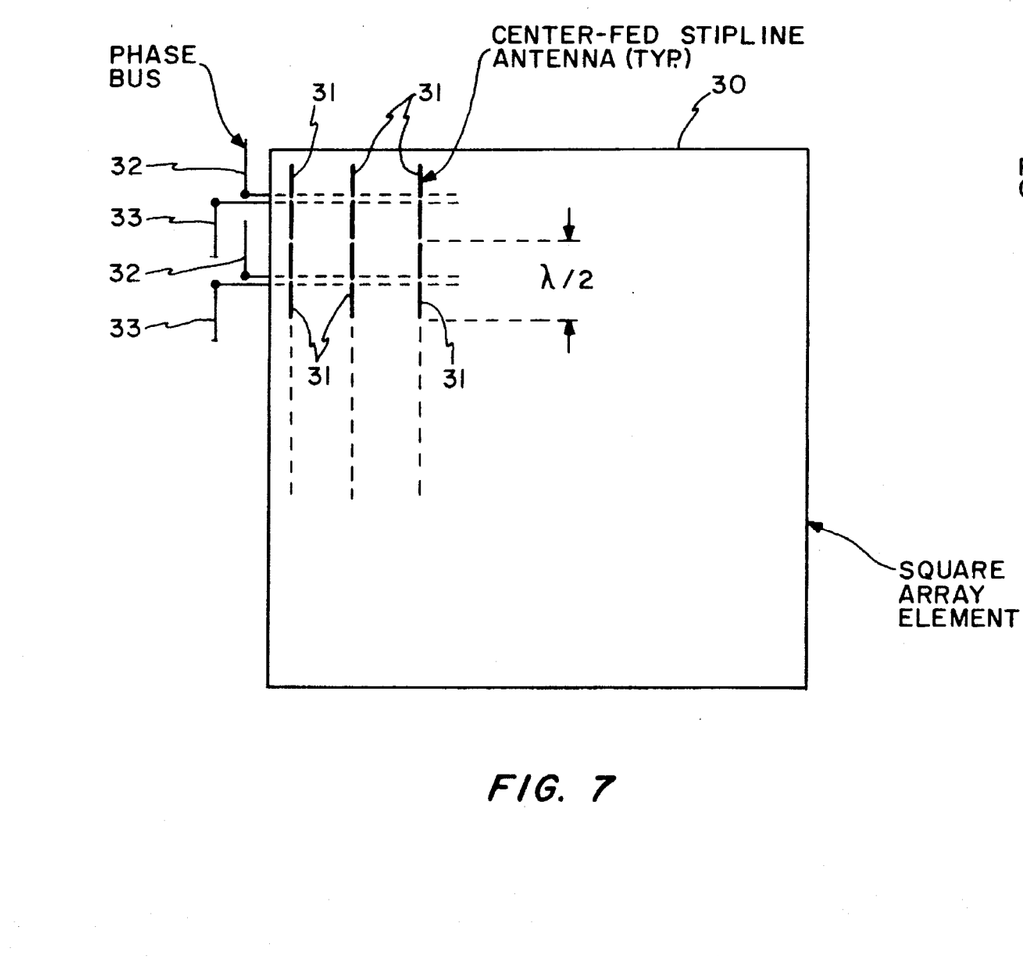
FIG. 7 is a dagrammatic illustration of an antenna element for use in the system of FIG. 1.
Figure 8:
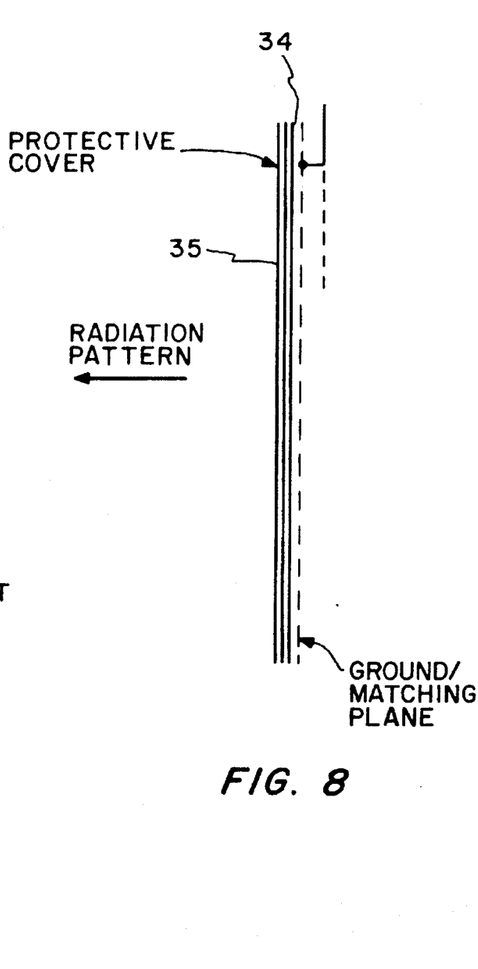
FIG. 8 is a diagrammatic elevational view of the antenna element shown in FIG. 7.

A one-square-meter array element 30 for the transmit antenna is illustrated in FIG. 7. The complete phased-array transmit antenna is 150 to 300 meters wide, but it is formed by simply replicating the one-square-meter array element 30 illustrated in FIG. 7. The element 30 comprises multiple rows of center-fed linear stripline radiators 31 spaced from each other by $N_e\lambda/2$, $N_a$ between one and twenty $F_1$, and designed to operate at a frequency between about 3 and 30 GHz. The radiators 31 are fed by phase busses 32 and 33. The radiators 31 are formed on the surface of a dielectric board 34 which is covered by a protective cover 35.

For the system of this invention, the beam CEP is tantamount to the missile CEP because the missile is a passive RF beam rider and will impact within a few centimeters of the center of the RF guiding-center gradient at the location of the target. A fully active, phase shift steered RF beam is used. A conventional software controlled acquisition and tracking system is used, with either the entire array multiplexed for radar use or a small, dedicated fraction of it used for this purpose. A computer handles the geographical SATCOM/SATNAV tropospheric and ionospheric algorithms, real time beam steering (target radar mode tracking) and array power range compensation calculations, multiplexing and system re-set functions and missile launch mode and timing commands. The goal of the array is to achieve an atmospheric compensated, essentially diffraction limited beam cross-section at the target after transiting most or all the earth's troposphere and ionosphere under all weather conditions.

Nominal total (maximum) array source power, $P_s$, is about 1000 MW for an array width of 150 meters. Note that for a 150 m array, this corresponds to only about 40 KW/m$^2$, and with about 4000 x-band linear dipole radiators per m$^2$, this is only about 10 w per oscillator (amplifier) at full power. Thus, a strategic size defense system can be operated with all solid state digital RF electronics, eliminating high voltage packaging. This also lends itself to relatively inexpensive production costs.

2. System Gain

The antenna is a square array with typical center-fed linear radiators located in the x—z plane, at position vectors from the center of $r_\mu = iau + kaw$, with unit vectors i,k and integer number of oscillators u,w. A large array can be constructed from interconnecting boards, with the small stripline type radiation elements of negligible thickness in width and depth deposited on its surface, with protective covering and mechanical supports located as a connecting base. The phase control bus, digital interrogation paths and radar multiplexing circuits align mechanically for ease of insertion and replacement.

A spherical coordinate system is used, with the radiation magnetic field along $\phi$, and with the electric field having both r and $\Theta$ components. The normal to the array is located at $\Theta = \phi \approx \pi/2$. The observation (range) point from the antenna center is r, the difference in signal travel distance from any radiator to this point is $\boldsymbol{\delta}_{u,w}$, and $r_p$ is the distance from any radiator u,w to the observation point. The magnetic field from a typical element at range r is given by the following expression:

$$dB_\Phi = F(\Theta) \exp[wt - \Psi_{u,w} - \beta(r-\delta)],$$

where $F(\Theta)$ is the radiation from a single radiator, $\Psi$ is the phase shift between oscillators, and $\beta$ is the propagation wavenumber.

$$F(\Theta) = \frac{I_{u,w}[\cos\beta 1 - \cos(\beta 1 \cos\Theta)]}{cr_p \sin\Theta} \; ; \; \beta = w/c = 2\pi/\lambda$$

$I_{u,w}$ is the current amplitude in each elementary radiator. The z axis coincides with the radiator axes, as does $I_{u,w}$, and they are all parallel. The spacing in both directions is a, and the range radial unit vector is r/r, where r is range magnitude from the array center. The distance to the range point from any element in the array is given by $r_p = r_\mu + r$, or $r_p = (r_\mu^2 + 2r\tau_\mu + r^2)^{1/2}$. Then the difference in signal travel distance to the range point from the center and any element is $\boldsymbol{\delta} = r[(r_\mu^2/r^2 + 2r\tau_\mu/r^2 + 1)^{1/2} - 1]$.

Using this value for $\boldsymbol{\delta}$, $r_p$ in the general expression above for dB, one has for the total phase and time dependent radiation field $B_\Phi$, at the range point the sum over all oscillators given from the above by the real part of:

$$B_\phi = A \sum_{u=0}^{m_x-1, \, m_z-1} \sum_{w=0} \exp -j\{\beta r[2 - a^2 u^2/r^2 + a^2 w^2/r^2 +$$

$$(2a/r)(u\sin\Theta\cos\phi + w\cos\Theta + 1)]^{1/2}\}$$

$$\exp(jwt) \exp{-j(u\xi + w\zeta)}/[a^2u^2/r^2 + a^2w^2/r^2 + (2a/r)(u\sin\Theta\cos\phi + w\cos\Theta + 1]^{1/2}$$

where $m_x, m_z$ are the total number of radiators in the array and $\xi, \zeta$ are constant delta phase lag between radiators along x,z. The array is only one deep in the down range direction ($m_y = i$), producing in effect a "plane" array in the x,z plane. The quantity A above is the same as the previous $F\Theta$ with $r_p$ replaced by the range magnitude r.

The Poynting flux at the range point can be obtained as $S(\Theta,\phi,r=c/8\pi \; |\text{Re}(\text{ExH})|=(c/8\pi)\epsilon^{-1/2}|\text{Re}(B_\phi)|^2$ where the braces mean time average. All terms must be retained in order to evaluate the gain as a general function of range from the transmit antenna down to and including values less than one array width (launch mode).

The value for a is $\lambda/2$, and the elementary oscillator length is a fundamental resonant linear antenna, with length $21 = \lambda/2$. The gain G tends to increase with increasing distance up to a maximum at a range of about $r \approx r_\mu^2/\lambda$, where $r_\mu$ means the array width. Then it decreases with further increase in r and approaches that corresponding approximately to the far field value of an ideal paraboloid of revolution $\approx (\pi D/\lambda)^2$. The peak gain is always about 10 dB above the paraboloidal far field value. Therefore, the RF coverage or "spot size", corresponding to the product of range and the half power angle, tends to vary by much less than proportionally with range up to the maximum gain point, before increasing with further range.

The gain is defined as $G \approx (\pi/\Delta\phi)^2$, where $\Delta\phi$ is the numerical half power angle, in analogy with an ideal paraboloid. As an illustration of parameter values, for $\lambda = 3$ cm (x-band), and $r_\mu = 300$ m array width, corresponding to the maximum gain range of about 750 km, an approximate value of spot size y is 15 m, and for $\lambda \approx 1$ cm, about 5 m with the same antenna width. These values are reduced by much less than proportionally with decrease in range from the maximum gain range to the launch range, because as mentioned earlier the gain increases with range from launch to the maximum gain range approximately with r$^2$, such that $y = r\Delta\phi = r\pi/G^{1/2}$. This parameter varies from nearly a constant within a factor of a few of the maximum gain range, to several hundred from a launch point equal to one array width to the maximum gain point.

3. Array Performance Sensitivities

The general behavior of a large phased array, approximately 150 to 300 m in width, is that an array parameter, $r_c$, defining the transition point between variable and constant gain is given by $r_c = r_\mu^2/\lambda$. The gain varies with range below this range and approaches a constant well above it, but with the constant gain value (approximately that of an ideal parabola) about 10 dB below the peak. Also, the delta phase shift between individual radiators required for a given RF spot size (target resolution length) depends upon wavelength and delta spacing only, and is also an approximate measure of the allowable delta phase noise from the carrier and tracking loops which can be tolerated for a given desired target beam resolution.

a. RF and Propulsive Efficiencies

Since some natural increase in gain with increasing range occurs as a proximity effect, one need modulate the power only by the product of range and gain, $(G_{r1}/G_{r2})(r_2/r_1)^2$, to maintain a given flux on the missile antenna. In a typical case, this quantity varies from launch to a point $0.1r_m$ by about 200, from this point to about $0.70r_m$, by about 10 and from this point to the maximum gain point, $r_m$ is unity. Since the missile spends most of its time in a range in which only a very small fraction of maximum power is needed, and the last 30% with essentially full power, the duty cycle is still about one third and the efficiency does not change significantly (only by factors of the order of unity).

b. Beam Resolution and Reflux Gradient

Note that the missile can be operated with passive roll stability with its guiding center along the orbit having a large gradient in power density. Alternatively, a four lobe pattern with about one fourth the power in each, can be used with no roll control, with a spread between lobes of about a half power angle for a single beam, with the missile orbit along the pattern symmetry axis. There are other possibilities as well, but the idea is to track the target along the steep slope of the pattern, not from the center of a single lobe pattern, which in fact has a zero slope on the center, to maximize the tracking ability and acquire capability while minimizing beam CEP for a given target area.

An estimate for dy can be obtained using a single lobe gain function for an ideal parabolic antenna, $S_p$. The flux at range is given by $S_p=(S_0a^2/2)\exp-(2.76\Theta^2/\Delta\Theta^2)$, where $\Delta\Theta$ is the 3 dB or half power angle from the center of the pattern ($\Theta=0$). This expression is accurate to within less than 5% down to the 6 dB point. Taking the gradient of this expression, $dS_p/d\Theta$, and evaluating the fractional flux change evaluated at the off-set angle $\Theta \simeq \Delta\Theta$, the result, after replacing the parabolic gain by the maximum array gain, $G_a \simeq 10G_p$, is $$\frac{dS_p}{S_p} = (5.52)(10G_p)^{1/2}d\Theta,$$

and where $d\Theta$ is the angle subtended at the antenna by a diameter dy at the target$\simeq$dy/r.

Note that at a range of about $10^7$ cm or 70 miles, and a dy of 20 cm, this corresponds to a beam resolution of about $2\mu$ radians or about $10^{-5}$ rad delta shift between oscillators in an x-band system. If this is set equal to a 3 dB value for this ratio, the value of $d\Theta$ is given by $d\Theta \simeq \pi/11(10G_p)^{1/2}$, or with $G_p \simeq (\pi r_\mu/\lambda)^2$, $d\Theta \simeq \lambda/35r_\mu$ for an effective sensitivity for the array along the maximum power gradient. Note that this corresponds to a target diameter d at a range of about 750 km (468 mi) of 2 m with $\lambda=3$ cm and an array width $r_\mu$ of 300 m. With $\lambda=1$ cm and the same array, this about 66 cm.

The missile guiding center is determined by the gradient in the power density. Undulations about this center are determined by dynamics in the orbit. The missile near a target should have an excursion of no more than a few cm from the guiding center, determined by the damping forces and cross-track acceleration from beam tracking or other end-game maneuvering. A servo loop involving lead/lag predictor corrector (radar) algorithms, combined with an appropriate system design analysis as outlined above involving range, antenna width, wavelength and missile guiding center dynamics provides a beam minimum target intercept sensitivity dia of about 20 cm. This effectively means that the transmit antenna RF Poynting gradient at the target is essentially equal to the atmospheric compensated, diffraction limited cross-section, as in a SATNAV system. This performance is achieved by using a cesium beam frequency standard for phase referencing across the array, as described below.

c. Beam CEP and Phase Stability

The transmit antenna system is designed to control the phase noise between adjacent radiating elements to values much less than the delta phase beam steering commands, and is comprised of a cesium beam tube or frequency and time standard (FTS or equivalent) phase reference signal transmitted via transmission line to each radiator and a phase shift circuit, containing an insitu digital phase shifter loop to offset from the FTS the commanded values of $\Delta\xi$, $\Delta\zeta$ for tracking the target with the beam pattern and passively providing both beam and time average or $1\sigma$ CEP.

The phase shifter is a digital carrier tracking loop with band width capable of tracking time dependent oscillator and local phase noise, of a type well known in SATCOM engineering. The digital loops located at each radiator function in a closed loop, replicating the fundamental FTS signal plus random phase noise, shifting the phase relative to this reference the required amount during each system re-set or refresh cycle time, and maintaining this shift via a servo loop and sample/hold with the local radiator oscillator until the next cycle changes the phase offset. These systems are well developed and are capable of wide bandwidth tracking and locking on the reference signal (carrier plus noise) to a phase offset uncertainty of less than 1% of the delta phase command and the excursion of the random phase noise. Only the intended delta phase command, without appreciable phase noise, is transmitted to the local radiating elements.

The FTS signal is digitized and the shift register containing the significant word length for $\Delta\tau$, $\Delta\zeta$ is compared to the commanded values at each refresh time and the required number of pulses removed or added to implement the phase shift with the correct polarity. As in a SATCOM loop, very small phase shifts, amounting to removing or adding a single pulse over the refresh time (at least several tens of microseconds), can be accomplished and this digital quantization limit corresponds to microradian values of analogue phase shift. The signal is then passed through an appropriate up-converter (frequency multiplier) and filter and the shifted and replicated signal is applied to the input of the local radiator solid state amplifier. The amplifier output may also be tracked continuously and slaved to the required offset to within an amount equal to the least significant place in the phase word, or about $\simeq \pm$one pulse per refresh time. The total phase noise of an oscillator is composed mainly of white frequency noise, frequency flicker noise and white phase noise. These can be conveniently estimated by an Allen variance[3] which is a function of the measurement time (system cycle time), and various powers of the average carrier frequency, representing the noise power spectral density for each contributing mechanism. The FTS has very small values of aging and other deterministic caused phase shifts, with an overall stability of a few parts in $10^{12}$. The Allen variance over the system cycle time $\tau$ for a cesium beam cavity operating at the 10 Ghz line[3] is given by $\sigma(\tau) \simeq \tau^{1/2}$ radians, and for a refresh (measurement) time of $10\mu$ sec, one has a random phase noise of about $10^{-3}$ rad. Tracking loops are capable of replicating this noise plus average signal to well within a microradian at easily attainable band widths. Because of common mode rejection, the array is only sensitive to the net difference in phase transmitted between oscillators.

The cesium beam cavity itself can be modeled as an oscillator with n intrinsic Q of about $4\times10^7$. The important point is simply that the phase noise from the FTS reference, after common mode rejection and tracking, seen as a delta phase signal to adjacent elements in the RF excitation system, will correspond to much less than the phase shift steering signal corresponding to 20 cm beam center movement at a range of about 150 km, or as a random beam spread in angle by this amount, as discussed earlier.

A typical array of 300 m in width and $\lambda=3$ cm, spacing between oscillators of $\lambda/2$, length of oscillators also about $\lambda/2$, has a ratio of beam center displacement to delta phase command (constant) between adjacent oscillators of $\Delta\phi/\Delta\zeta=0.3196$, where the delta command value is uniform across the array. Minimum target subtended angle corresponds in the example to a beam spread of about $2\mu$ radians, or a delta phase of $0.6\times10^{-5}$ rad.

The CEP is determined, statistically speaking, by the location of the time average power gradient at the target. The missile motor and control system will not respond except as an integrator to the small refresh pulse to pulse changes in steering. As long as the mean position of the beam on a millisecond time scale is centered on the desired target area, even with larger than dy/r short time-scale beam tracking displacements, the KKV $1\sigma$ CEP for missile will be within a few cm of this average center point.

The generalization to operation in a barrage mode is straightforward. Since only a small fraction, of the order of one percent, of the RF total radiated power is used per KKV, up to a hundred missiles can be launched in space and time with the same RF system to increase the intercept probability and lethality at a given range, or maintain one at a much larger range.

B. Propulsive and RF Efficiencies

In the missile example given earlier, it was assumed for simplicity in analysis that a constant acceleration force acted during the engagement. This can be implemented by modulating the RF source power inversely with the range in real time, as estimated from the array radar. This method will be assumed in the following. For simplicity, the effects of aerodynamics in dense air and gravity forces have been ignored.

First, the ratio of the average total radiated power $\ddot{P}_s$ to the peak required power, $P_s = 8\pi S_a \mathbf{6}^2(t_b)/a^2$, during the burn time $t_b$, in order to maintain a constant acceleration during $t_b$, is given by the simple relation:

$$\frac{\ddot{P}_s}{P_s} = \frac{1}{P_s t_b} \int_0^{t_b} P_s(t)dt =$$

$$\int_0^{t_b} \frac{[t + (m_0/\dot{m})(1 - \dot{m}t/m_0)\ln(1 - \dot{m}t/m_0)]^2 dt}{t_b[t_b + (m_0/\dot{m})(1 - m_f/m_0)\ln(1 - m_f/m_0)]^2}$$

If the terms with the logarithms are small compared to the burn time, as most often happens for high efficiencies, then $\ddot{P}_s \approx P_s/3$, and this approximation was used in the table above.

Next, two basic efficiencies, $\beta_p$ and $\beta_{RF}$, the propulsive and RF efficiencies, can be defined. The propulsive efficiency is defined as the ratio of payload kinetic energy at time $t_b$ to the total energy absorbed by the fuel, $m_f c_p \Delta T$. The RF efficiency is defined as the ratio of the payload kinetic energy at $t_b$ to the total RF energy radiated by the transmit antenna during time $t_b$.

From the definition, and using the earlier derived results from the equation of motion and energy conservation, one has for the efficiencies:

$$\beta_p = (m_0/m_f - 1)\ln^2(1 - m_f/m_0)^{-1}$$

$$\beta_{RF}/\beta_p = 3A_t a^2/16\pi c_p \Delta T t_b^2,$$

where $A_t$ is the receive antenna RF cross section, $\Delta T$ is temperature rise in cavity, $t_b$ is burn time.

$\beta_p$ is a function only of the parameter $m_0/m_f$ and its reciprocal. Note that $\beta_{RF}$ is proportional to the maximum theoretical antenna gain $a^2$ and the antenna cross-section. Typical values for these parameters for a missile system are in the range $\beta_p \approx 50\%$ and $\beta_{RF} \approx 1.2\%$. Even though $\beta_{RF}$ may appear small, of the order of a few percent or less, it must be remembered that this is a comparison of the kinetic energy of a small payload as a fraction of integrated total RF energy radiated. Total radiated energy can be in the range of $10^9$ joules for these large systems, supplied by a large distributed energy storage system (capacitive, inductive, kinetic, MHD) located at the transmit antenna site, and used only for high power defense engagements. This also indicates, as mentioned earlier, that a salvo in space and time involving many missiles can be launched with the same system.

More routine RF operations, such as periodic system integrity validation, training and search radar involve only modest conventional power grid use.

C. RF Design, Guidance and Control

A missile is controlled and guided to its target by variation in the angle of the thrust vector with respect to the transmit beam center. This is done in turn by passively sensing both the angle of incidence of the received power at the missile antenna and the cross-track gradient in transmitted RF power density at the location of the missile. Independent control of the physics of each of these elements is under the control of the designer.

D. RF Design

As shown previously, an RF cavity does not require an unusually large $Q_0$ to be effective. Note that in the previous example of a TAD size missile system, a loaded Q providing even as large as 5% of total absorbed RF energy in skin effect losses ($\approx 0.8$ MJ at $\beta_b$ of 60%) raises the temperature of a BeCu cavity conductive liner 200 microns thick (two hundred grams) only about 1000° C. during an engagement lasting 40 sec.

The RF design must maintain a relatively high loaded Q and a mode spacing greater (low mode density) than $Q_1$ width for mode discrimination, and control cavity loading (external Q) from power coupling and fuel ingress and egress ports. These in turn determine the motor reaction or throttle time constant, with a direct bearing on guidance and control.

The main RF design issues have to do with maintaining a relatively high loaded Q, mode spacing greater (low mode density) than $Q_1$ width for mode discrimination, and controlling cavity loading (external Q) from power coupling and fuel ingress and egress ports. These in turn will determine the motor reaction or throttle time constant, with a direct bearing on guidance and control.

The example with $r_n = 20$ cm can be used, where ten right circular cylindrical cavities are used for the gas generators. The $TE_{mnp}$ modes have m azimuthal, n radial and p length nodes. For this geometry, the $TE_{0,1,9}$ mode may be selected. The cavities are about 5 cm in radius and 15 cm long. The tangential electric field zero boundary condition for these modes provides the root from $J_0(\gamma_{01}r/r_c)=0$ so $\gamma_{01}=3.832$ for this mode (this is degenerate with the $TM_{010}$ mode, but this is easily removed). The eigen frequencies are given by; $(w/c)^2=[(3.832/r_c)^2+(p\pi/L_c)^2]$ and, from the previous section, $Q_r/Q_0=(A_c/V_c)k_0 \delta/\alpha_f$ where $\alpha_f$ is fuel RF absorption coefficient and $\delta$ is BeCu skin depth at 10 Ghz.

For this geometry, $A_c/V_c=2(r_c/L_c+1)/r_c$. Using values for $\delta \approx 10^{-4}$ cm, $k_0=2.09$, and $\alpha_f=5.0$ cm$^{-1}$ and the above values of $r_c, L_c$, $Q_r/Q_0=4\times 10^{-2}$, or about 4% of the absorbed RF energy goes into the surface heating of the cavity conducting liner, which does not seriously degrade the performance of a cavity during most of the engagement time.

The motor throttle time constant $t_m$ can then be estimated as $V_c\rho_f/\dot{m}_c$, where $\dot{m}_c$ is the fractional mass flow rate through each cavity. In this case, $\dot{m}_c=10$ gm/sec and $V_c=10^3$ cm$^3$, $\rho_f=1.8\times 10_{-3}$, so $t_m \approx 0.2$ sec. These parameters can be varied with reasonable mode density, cavity Q ($V_c$) and fuel thermodynamic operating point $\rho_f$ to provide a range of values for $t_m$ of $0.01 \leq t_m \leq 1$ sec. As evaluated below, the inertial time constants are in the range 0.25 seconds for the missile, so a $t_m$ can be designed to be much less than this value thereby greatly simplifying the guidance and control analysis.

Finally, the DeLaval nozzle and fuel injector ports, as well as the power coupler for the power levels and fuel flow rates used for missiles, are all far below cut-off for this frequency, and the external Q at any useable $V_c$ is very large compared to $Q_0$. A well defined high Q RF boundary can be imposed easily in any case using high permeability conductive grids.

E. Guidance and Control

Figure 4:
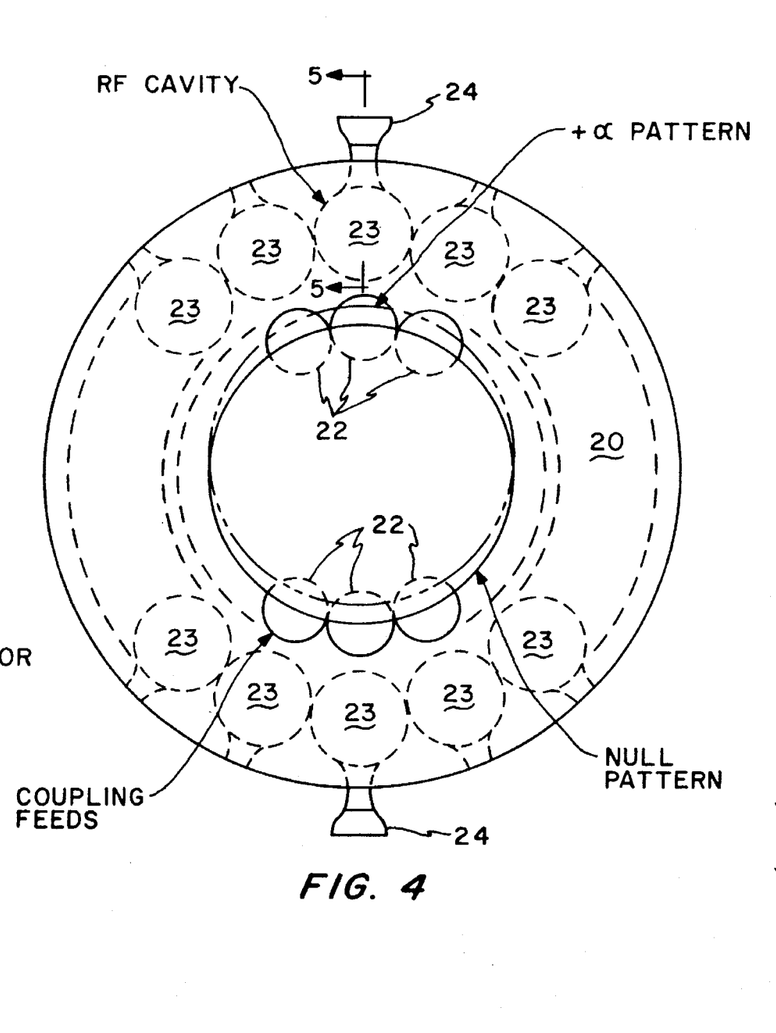
FIG. 4 is a plan view of the tail end of the missile illustrated in FIG. 3.
Figure 5:
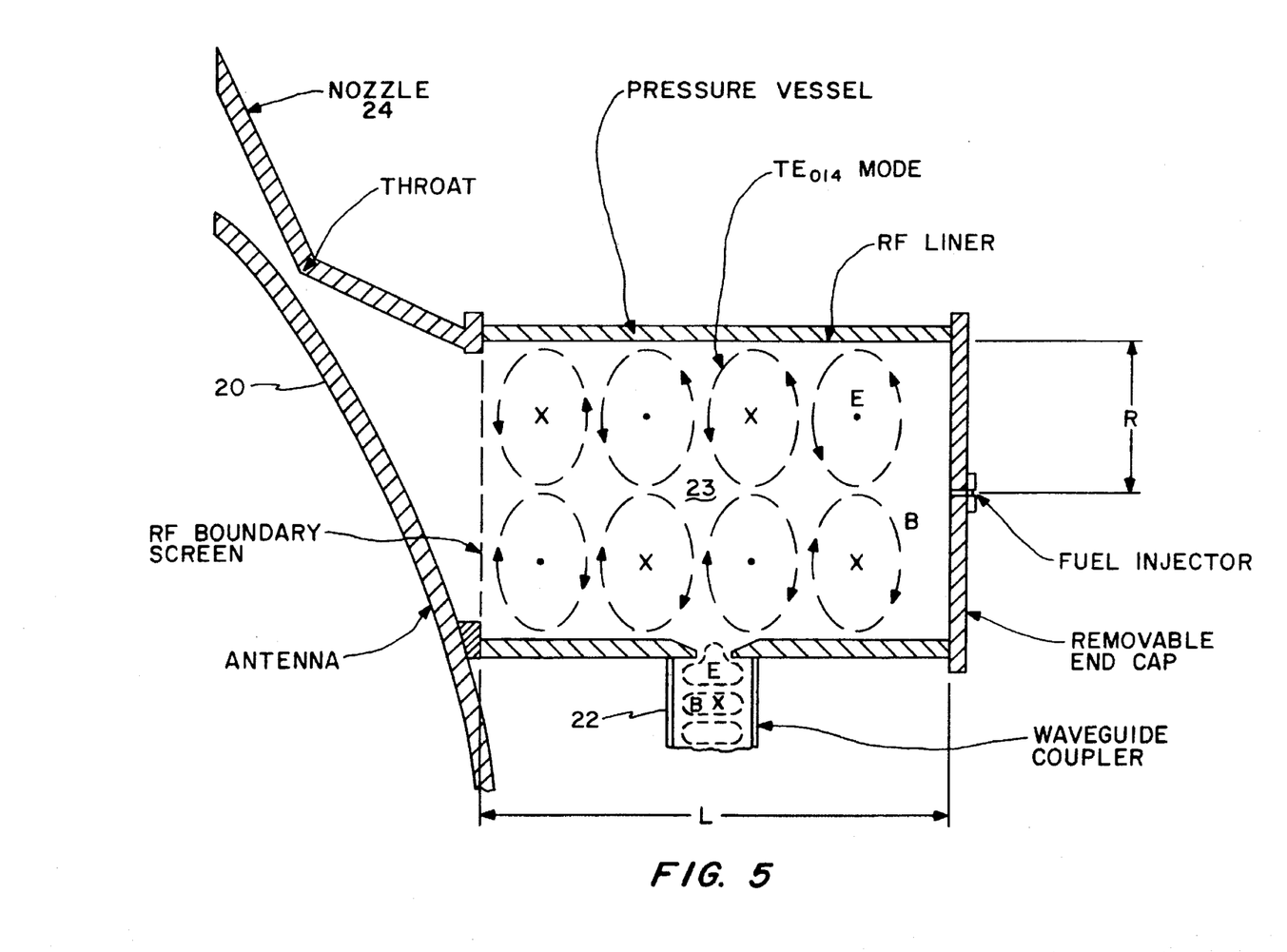
FIG. 5 is an enlarged section taken generally along line 5—5 in FIG. 4.
Figure 6:
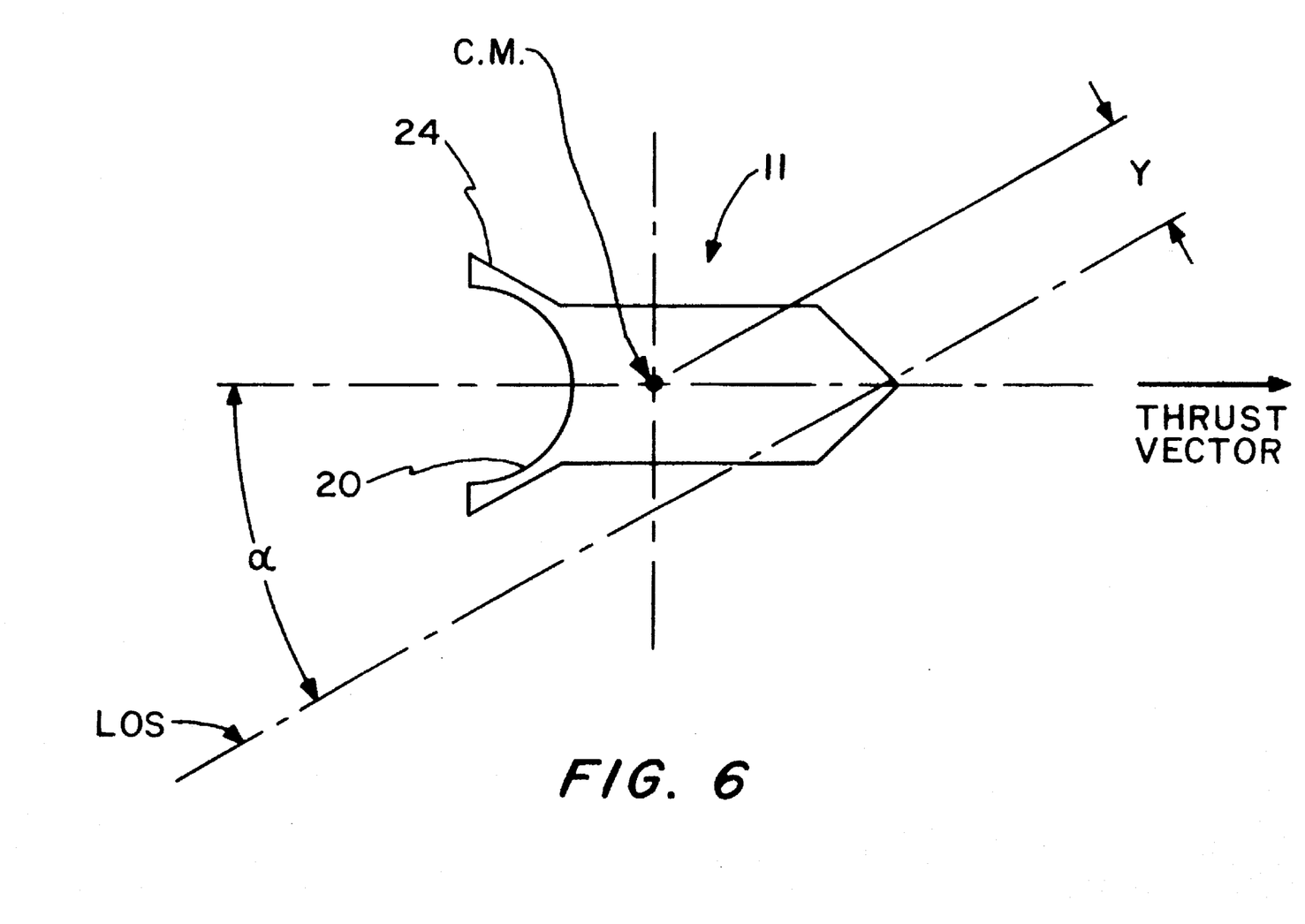
FIG. 6 is a diagrammatic illustration of a missile and displaced from its desired path along the axis of the radiation beam.

In FIG. 4, $\Theta$ is the angle subtended at the transmit antenna center by the radiation Poynting flux, $\alpha$ is the missile body rotation angle about an axis perpendicular to the LOS from the transmit antenna, and y is the cross-track excursion of the c.m. of the missile from the LOS. If the missile is disturbed from the center of the beam ($\Theta=0$) by aerodynamic forces or from angular acceleration in inertial space resulting from beam tracking, or other forces not along the LOS, it will tend to drift asymmetrically into the beam cross-track or angular radiated power gradient.

There are available at least two passive sources to provide a reaction torque about the missile axis. One involves $\Theta$ and the other $\alpha$. Any $\alpha$ other than zero will provide a component of acceleration along y from the thrust force $f_a$ equal to $\alpha f_a$. It must be remembered that the missile is accelerating during the entire orbit time to the target with essentially a constant accelerating force, $f_a$. The $\Theta$ dependent torque results from the field power gradient, characteristic of the transmit antenna radiation pattern at the missile orbit location, and the other from the receive antenna matching and cut-off characteristics, dependent upon the direction of incoming radiation relative to the local antenna symmetry axis.

If the gradient in the $\Theta$ direction of the transmit power density $S_r$ is denoted by $Grad(S_r)$, R the range, $f_\alpha$ thrust, $r_n$ mean missile nozzle radius, $r_\alpha$ mean receive antenna radius and $S_r$ the nominal average propulsion power density at range, evaluated at $r_\alpha$, the reaction torque about an arbitrary missile pitch axis, caused by a small drift y, of the c.m. away from the LOS has the value:

$$\tau = a_1 y,$$

where $$a_1 = \frac{f_\alpha r_n Grad(S_r)}{R\,S_r}$$

The gradient is evaluated at the equilibrium angle subtended by $r_\alpha$ at the transmit antenna, $\Theta_0=r_\alpha/R$, where $R>>r_\alpha$. This torque must have the sense to provide an increasing value with increasing rotation angle $\alpha$, so as to tend to redirect the thrust vector towards y=0 and correct the drift. This in turn depends upon both the sign of the gradient and the internal design of the missile receiver system. The receiver can be inverted so as to provide a sign change, or $Grad(S_r)$ can be reversed by design of the transmit antenna array. This equation comes about because the change in radiated power across the receive antenna as a fraction of total required average (propellant) radiation flux will produce a proportional fractional change in thrust across the nozzle area. It must be modified slightly to take into account the fact that the gradient direction when averaged is only effective over a fraction $\approx 2/\pi$ of the total receiver area. Also, the assumption will be made that the motor reaction or throttle time constant, resulting from a change in power absorbed, is small compared to inertial reaction time scales described below.

On the other hand, the reaction torque $\tau_2$ associated with variations in received power on the missile horn array as a function of $\alpha$, resulting from the sub-reflector antenna design, must be such as to counter the rotation, with a negative reaction torque about this same axis. This comes about because as the missile antenna rotates about an axis perpendicular to the LOS, and produces $\alpha$, one side of the antenna focuses less power on one side of the horn array, and the cavities to which they are coupled, than that provided by the other side of the antenna. Basically, one side loses radiation flux from the small area region of the antenna near the base but retains that from the larger area and the other the reverse of this, resulting in an absorbed power gradient. For small angles, denote this by $\tau_2=-a_2\alpha$. The basic control scheme then is to direct a component of the thrust vector toward the y=0 axis by coupling the angular motion. For small angles, the y component of thrust for a positive $\alpha$ is given by $f_\alpha\alpha$. Neglecting aerodynamic damping, the control equations of motion describing the missile angular acceleration about the c.m. and the linear acceleration of the c.m. are as follows (the equilibrium position for both coordinates is y=0 and $\alpha=0$):

$$d^2\alpha/dt^2=a_1 y - a_2 \alpha$$

$$d^2 y/dt^2=-a_0\alpha$$

Since these equations are linear with constant coefficients, the system stability criteria can be obtained by making the substitution for the time dependence exp(jwt), and examining the eigen values $\lambda_i$ of the simultaneous system. One readily finds:

$$\lambda_\pm = \frac{a_2}{2}\{1 \pm (1-4a_1 a_0/a_2^2)^{1/2}\}$$

and $w_1=\pm(\lambda_+)^{1/2}$, $w_2=\pm(\lambda_-)^{1/2}$, the system eigen frequencies. In order to remain stable, it is necessary for $\lambda_\pm>0$ and to be real. The condition is then given by $a_2^2>4a_1 a_0$. In order to demonstrate typical control parameters, a specific example will be described for a simple parabolic transmit antenna and parameters used in the earlier examples.

For mathematical simplicity in this example, it will be assumed that a uniformly illuminated paraboloid ground based antenna (transmit antenna) is used. Note that this means the receive on-board cavity feed horn array must be phase reversed from the antenna. This is accomplished by providing a spiral routing for the guides to individual cavities. Then the thrust increases on the same side of the antenna receiving a relative power decrease. However, this also means that the antenna horn array cut-off characteristic must be phased so as to tend to reduce $\alpha$, even with the reversed horn connection. Note that one could also provide a transmit array pattern having a depression along $\Theta=0$, a reversed gradient, and no need to spiral the feed guides on the missile. Then, the horn array cutoff characteristic of a straight through horn array would have the correct sign for $\tau_2$ (this is more natural for the $\tau_2$ term). The point is that several possible design variations, leading to stable propagation orbits, can be found.

The ratio of Poynting flux at range R, $S_r(\Theta,0)$, to the peak flux (at $\Theta=0$ =bore site from antenna center), $S_m$, is given by the well known result:

$$\frac{S_r(\Theta,\phi)}{S_m} = [2J_1(X)/X]^2,$$

where $x=a \sin \Theta$, and $\alpha=xD/\lambda$. D is transmit antenna diameter, $\lambda$ is radiation wavelength, and $J_1$ is the first order Bessel function. For this simple transmit antenna, $S_r$ is independent of the azimuthal angle $\phi$.

By normalizing to the total source power, $P_s$, $S_m$ can be computed as follows, by performing the surface integral of the angular distribution function over the spherical surface at range R, $dA=R^2 \sin \Theta d\Theta d\phi$;

$$S_m = \frac{P_s}{\int [2J_1(x)/x]^2 dA} = \frac{P_s}{16\pi(R/a)^2[1/2 - (1/2a)J_1(2a)]}$$

and for $a \gg 1$, $S_m = (P_s/4\pi R^2)(a^2/2) = S_0(a^2/2)$ and consequently, $S_r(\Theta)=S_0(a^2/2)[2J_1(a \sin \Theta)/a \sin \Theta]^2$, where $S_0$ is the equivalent isotropic source flux at the range spherical surface.

For small angles near $\Theta=0$, the angular function can be shown to be accurately approximated (error zero to about 5% at the 6 dB point) by $[2J_1(x)/x]^2 \simeq \exp-[2.76(\Theta/\Delta\Theta)^2]$, where $\Delta\Theta$ is the half power beam width $\lambda/D$. One then has the following expression for $S_r=S_0(a^2/2) \exp-[2.76(\Theta/\Delta\Theta)^2]$, and can compute the gradient with beam angle as follows, where for $\Theta/\Delta\Theta \ll 1$ and the exponent is replaced by unity in the final expression:

$$\left\{ \frac{\delta S_r}{\delta \Theta} \right\}_{\Theta_0} = 5.52 S_f (a^2/2) \Theta_0/(\Delta\Theta)^2 = Grad(S_r)$$

$a_1$ then takes on the value:

$$a_1 = \frac{5.52\eta r_\alpha r_n D^2 f_a}{\pi R^2 I \lambda^2},$$

where I is missile moment of inertia about the c.m., $\lambda=$ radiation wavelength. $\eta$ is horn array/thrust efficiency.

Also, $a_0 = f_\alpha/m$, with m=missile mass. The value of $a_2$ implied for stability, $a_2^2 \geq 4 a_0 a_1$, can then be used to obtain an approximation for the highest system control frequency, $w(\sigma_+) \simeq a_2^{1/2}$, and the implied value for the reaction torque constant, $a_2$. Then, with $r_g$ the radius of gyration of the missile about the c.m.:

$$w^4 \simeq a_2^2 = \frac{22.0\eta r_\alpha r_n D^2 f_\alpha^2}{\pi m^2 r_g^2 R^2 \lambda^2}$$

Note that the only orbit (range) dependency for w is inversely with the product $(mIR^2)^{1/4}=(m^2 r_g^2 R^2)^{1/4}$. Hence, even though the range increases by about three orders of magnitude, m decreases by over two orders and one has the fourth root dependence. For earlier parameters of $r_g \simeq 10$ cm, $r_\alpha \simeq 12.5$ cm, $r_n \simeq 20$ cm, $R_{max}$ about $10^7$ cm (72 mi), $\lambda$ of 3 cm, launch mass m of $4 \times 10^3$ gm (final mass $2 \times 10^2$ gm), launch range R of about equal to D, w at launch is 52.6 rad/sec or about 8.4 Hz and w at $R_{max}$ is 26.8 rad/sec or 4.3 Hz.

The value of $a_2$ (or $w^2$) implies a reaction torque $Iw^2$, which can be compared to the theoretical maximum available control torque from the horn array cut-off gradient, $gf_\alpha r_\alpha$, with g the fraction implied, with g of unity representing 100% of that possible. In the above example, this gives g values of 23% and 0.7% respectively at launch and burn-out. The drift torque $Ia_1$ is about 1.75 lb-in for a drift y equal to one $r_\alpha$. The steady thrust is about 75 lb ($3.4 \times 10^7$ dynes).

Since typically many g's of acceleration exist at launch (8.5 in the example above), a relatively small hang-off angle is needed for horizontal launch to support the missile against gravity, and to handle aerodynamic forces within the dense regions of the atmosphere. Damping was ignored in the above simplified analysis, and although stable, any initial disturbance would remain in the orbit. Of course, fluid damping from the fuel and other means can be added to damp out any extraneous transients. As is well known, however, the presence of reasonable levels of damping does not invalidate the basic conclusions reached above on stability.

Finally, it was stated that the motor throttle time constant was assumed small compared to inertial times (and roll rates) in order to reduce the system equations to a simple illustrative form. The values of between 4 and 8 Hz ($t_i \simeq 0.25$ sec) are indeed long compared to achievable $t_m$ values, and a very simple control system results. In some cases, time dependent coefficients may have to be included in case too large a $t_m$ value is expected. Such considerations may also play a role in system performance design trade-off's in some applications.

| | GLOSSARY |
|---|---|
| BPM = | high power microwave |
| TAD = | theater area defense |
| RF = | radio frequency |
| KKV = | kinetic kill vehicle |
| DEW = | directed energy weapon |
| GHZ = | gigahertz or one billion hertz |
| X-BAND = | wavelength range between 2.7 and 3.7 cm |
| KW = | kilowatt or one thousand watts |
| MW = | megawatt or one million watts |
| J = | joule, a unit of energy = 10 million ergs |
| KJ = | kilojoule or one thousand joules |
| MJ = | megajoules or one million joules |
| gm = | gram |
| kg = | kilogram or one thousand grams |
| Atm = | atmospheres of pressure (approx. 14.7 lb per square inch) |
| g = | acceleration of gravity at the surface of the earth |
| TMD = | theater missile defense |
| LOS = | line-of-sight |
| CEP = | circular error probable = rms miss distance from target center |
| X-MIT = | transmitting antenna system |

I claim:

1. A system for propelling a solid body along a radiation pattern, comprising:

an antenna for transmitting electromagnetic energy having a desired frequency and radiation pattern;

a solid body that travels within the radiation pattern, comprising:

a fuel storage means for storing fuel;

a receiving antenna for receiving electromagnetic energy from the transmitting antenna;

a plurality of resonant cavities for receiving fuel from the fuel storage means and electromagnetic energy from said receiving antenna and heating said fuel with said electromagnetic energy to convert said fuel to a pressurized gas;

thrust generating means for propelling the solid body by releasing said pressurized gas from said resonant cavities through corresponding nozzles, and waveguides for transmitting electromagnetic energy from said receiving antenna to said resonant cavities, said waveguides being configured such that an asymmetrical distribution of radiation energy across said receiving antenna results in a corresponding asymmetrical distribution of energy among said resonant cavities to produce a correcting thrust force on the solid body, the inlet apertures of said waveguides being disposed symmetrically about the axis of said receiving antenna so that a translational deviation of the center of mass of the solid body from the axis of symmetry of the transmitted radiation pattern produces a correcting thrust on the side of the solid body that is farthest away from the axis of symmetry of the transmitted radiation beam, and an angular deviation of the axis of the receiving antenna from the axis of symmetry of the transmitted radiation beam produces a correcting thrust on the side of the solid body which is closest to the axis of symmetry of the transmitted radiation beam.

* * * * *